(12) United States Patent
Hoshina et al.

(10) Patent No.: US 12,040,486 B2
(45) Date of Patent: Jul. 16, 2024

(54) ELECTRODE, ELECTRODE GROUP, BATTERY, AND BATTERY PACK

(71) Applicant: KABUSHIKI KAISHA TOSHIBA, Tokyo (JP)

(72) Inventors: Keigo Hoshina, Yokohama (JP); Dai Yamamoto, Yokohama (JP); Tetsuro Kano, Yokohama (JP); Masanori Tanaka, Yokohama (JP); Yuki Watanabe, Yokohama (JP); Nobuyasu Negishi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 477 days.

(21) Appl. No.: 17/474,532

(22) Filed: Sep. 14, 2021

(65) Prior Publication Data
US 2021/0408540 A1 Dec. 30, 2021

Related U.S. Application Data

(63) Continuation of application No. PCT/JP2019/015502, filed on Apr. 9, 2019.

(51) Int. Cl.
*H01M 4/525* (2010.01)
*H01M 4/36* (2006.01)
(Continued)

(52) U.S. Cl.
CPC .......... *H01M 4/525* (2013.01); *H01M 4/366* (2013.01); *H01M 4/505* (2013.01);
(Continued)

(58) Field of Classification Search
CPC ......... H01M 10/052; H01M 2004/021; H01M 2004/027; H01M 2004/028; H01M 4/131;
(Continued)

(56) References Cited

U.S. PATENT DOCUMENTS 10,096,827 B2 10/2018 Harada et al.
10,096,833 B2 10/2018 Hoshina et al.
(Continued)

FOREIGN PATENT DOCUMENTS

JP 2006-19229 A 1/2006
JP 2012-54135 A 3/2012
(Continued)

OTHER PUBLICATIONS

International Search Report dated Jul. 2, 2019 in PCT/JP2019/015502 (submitting English translation only), 2 pages.
(Continued)

*Primary Examiner* — Victoria H Lynch
(74) *Attorney, Agent, or Firm* — Maier & Maier, PLLC

(57) ABSTRACT

According to one embodiment, an electrode is provided. The electrode includes a current collector and an active material-containing layer formed on the current collector. The active material-containing layer contains a lithium nickel cobalt manganese composite oxide and a lithium cobalt composite oxide. Pore size distribution obtained by mercury intrusion porosimetry for the active material-containing layer has a first peak top indicating a highest intensity $I_1$ within a pore size range of from 0.1 μm to 1 μm and a second peak top indicating an intensity $I_2$ which is a second highest intensity after the highest intensity $I_1$ within the pore size range of from 0.1 μm to 1 μm. A pore size at the first peak top is smaller than a pore size at the second peak top.

14 Claims, 7 Drawing Sheets

(51) Int. Cl.
*H01M 4/505* (2010.01)
*H01M 4/02* (2006.01)

(52) U.S. Cl.
CPC ............... *H01M 2004/021* (2013.01); *H01M 2004/027* (2013.01); *H01M 2004/028* (2013.01)

(58) Field of Classification Search
CPC ...... H01M 4/364; H01M 4/366; H01M 4/505; H01M 4/525; Y02E 60/10
See application file for complete search history.

(56) References Cited

U.S. PATENT DOCUMENTS

| | | |
|---|---|---|
| 10,319,986 B2 | 6/2019 | Tuduki et al. |
| 10,355,273 B2 | 7/2019 | Kuriyama et al. |
| 10,522,816 B2 | 12/2019 | Nagai et al. |
| 2012/0270093 A1 | 10/2012 | Isozaki et al. |
| 2013/0295456 A1 | 11/2013 | Nagai et al. |
| 2013/0330613 A1 | 12/2013 | Saruwatari et al. |
| 2013/0330623 A1 | 12/2013 | Matsushita et al. |
| 2015/0086851 A1 | 3/2015 | Morita et al. |
| 2016/0036010 A1 | 2/2016 | Saruwatari et al. |
| 2016/0036039 A1 | 2/2016 | Kuriyama et al. |
| 2016/0190586 A1 | 6/2016 | Hoshina et al. |
| 2017/0324080 A1 | 11/2017 | Tuduki et al. |

FOREIGN PATENT DOCUMENTS

| | | |
|---|---|---|
| JP | 2014-13748 A | 1/2014 |
| JP | 2014-63753 A | 4/2014 |
| JP | 5514332 B2 | 6/2014 |
| JP | 2014-167890 A | 9/2014 |
| JP | 5813736 B2 | 10/2015 |
| JP | 2016-35900 A | 3/2016 |
| JP | 2016-35902 A | 3/2016 |
| JP | 5963022 B2 | 8/2016 |
| JP | 2016-171083 A | 9/2016 |
| JP | 6058327 B2 | 1/2017 |
| JP | 6135253 B2 | 5/2017 |
| JP | 6167470 B2 | 7/2017 |
| JP | 2017-224496 A | 12/2017 |
| JP | 2018-45819 A | 3/2018 |
| WO | WO 2011/089701 A1 | 7/2011 |
| WO | WO 2011/108106 A1 | 9/2011 |
| WO | WO 2012/063369 A1 | 5/2012 |
| WO | WO 2012/111813 A1 | 8/2012 |
| WO | WO 2013/161083 A1 | 10/2013 |
| WO | WO 2015/040747 A1 | 3/2015 |
| WO | WO 2016/039424 A1 | 3/2016 |
| WO | WO 2016/084346 A1 | 6/2016 |

OTHER PUBLICATIONS

Genji Jimbo, et al., "Fine Particles Handbook" Asakura Bookstore, Sep. 1991, pp. 151-152 (with English translation).
Sohachiro Hayakawa, "Powders Properties of Measuring Method" Asakura Bookstore, Oct. 1973, pp. 257-259 (with English translation).

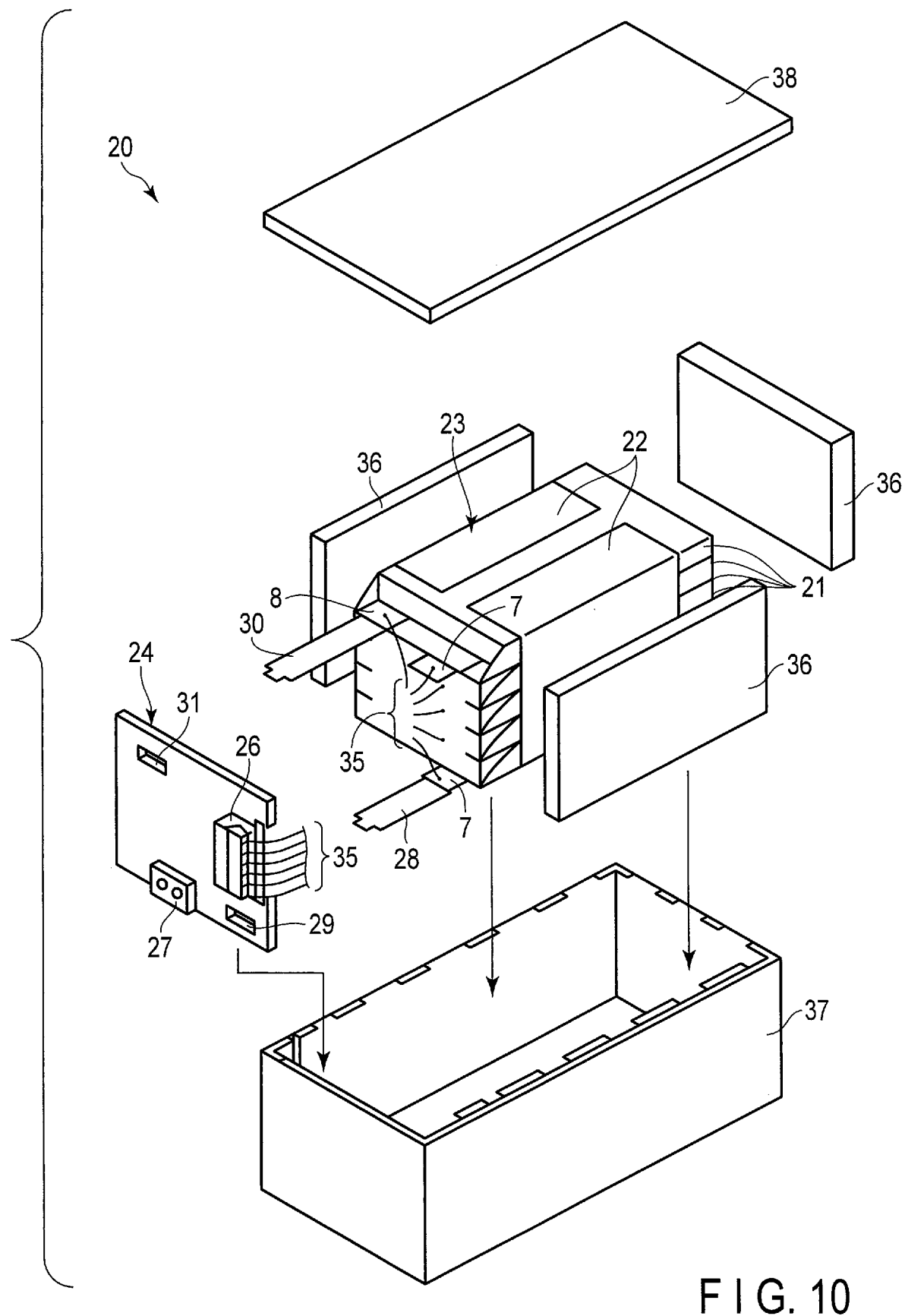
F I G. 10

ELECTRODE, ELECTRODE GROUP, BATTERY, AND BATTERY PACK

CROSS-REFERENCE TO RELATED APPLICATIONS

This application is a Continuation Application of PCT Application No. PCT/JP2019/015502, filed Apr. 9, 2019, the entire contents of which are incorporated herein by reference.

FIELD

Embodiments described herein relate generally to an electrode, an electrode group, a battery, and a battery pack.

BACKGROUND

In nonaqueous electrolyte batteries, charge and discharge are performed by lithium ions moving between a negative electrode and a positive electrode. Such nonaqueous electrolyte batteries have been actively studied as batteries having high energy density.

Such nonaqueous electrolyte batteries are expected to be used as, for example, power supplies for small-sized electronic devices and, in addition, as medium-to-large-sized power supplies for on-vehicle use or stationary use. In the use as medium-to-large-sized power supplies, the nonaqueous electrolyte batteries are required to exhibit excellent life characteristics and high safety. Moreover, in the use as medium-to-large-sized power supplies, the nonaqueous electrolyte batteries are also required to exhibit excellent input/output characteristics.

BRIEF DESCRIPTION OF THE DRAWINGS

FIG. 10 is a schematic exploded perspective view of a battery pack of an example according to a fourth embodiment.

DETAILED DESCRIPTION

Figure 1:
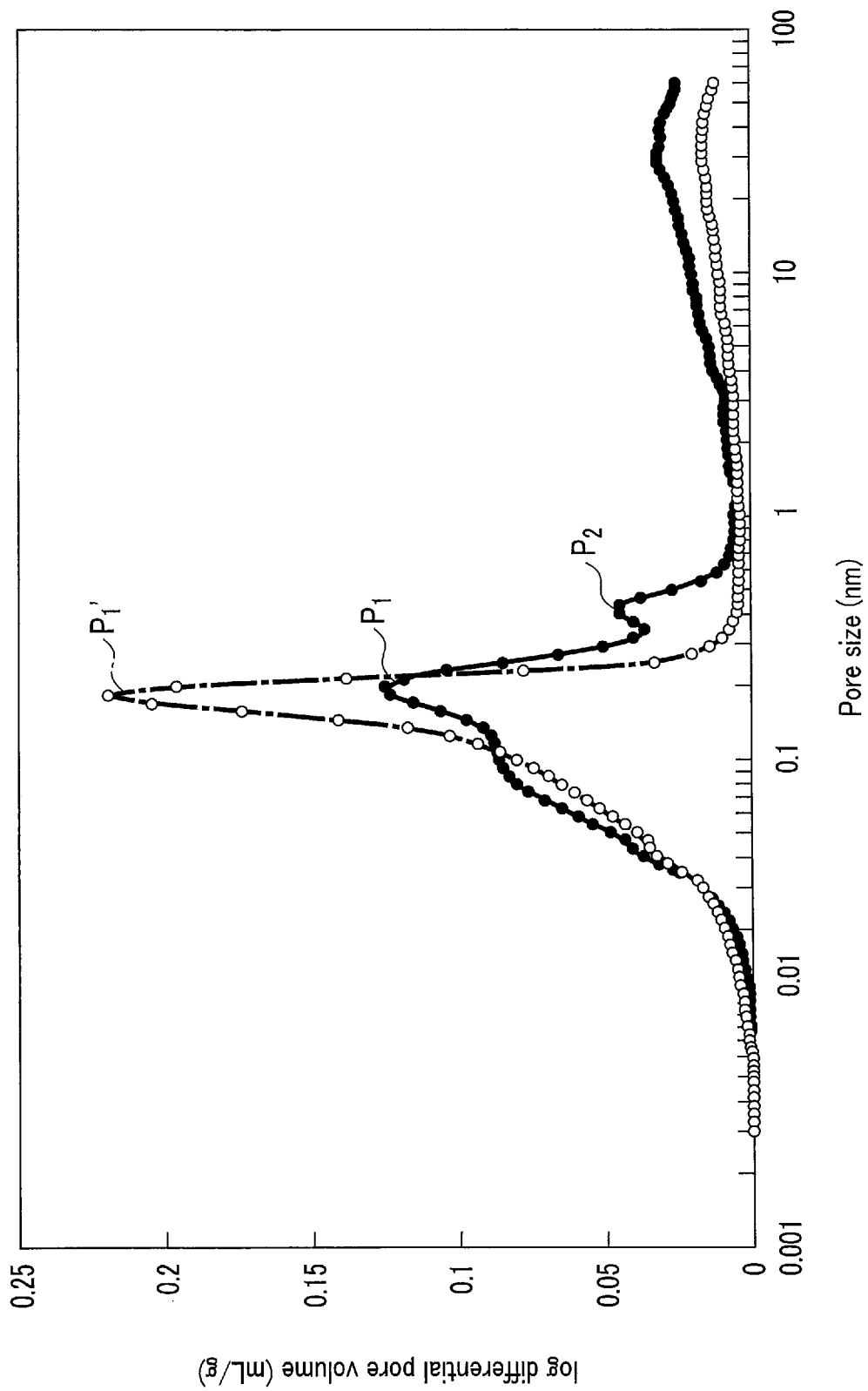
FIG. 1 shows pore size distribution of an active material-containing layer included in an electrode of an example according to a first embodiment and pore size distribution of an active material-containing layer included in an electrode of a reference example.

According to a first embodiment, an electrode is provided. The electrode includes a current collector and an active material-containing layer formed on the current collector. The active material-containing layer contains a lithium nickel cobalt manganese composite oxide and a lithium cobalt composite oxide. Pore size distribution obtained by mercury intrusion porosimetry for the active material-containing layer has a first peak top indicating a highest intensity $I_1$ within a pore size range of from 0.1 μm to 1 μm and a second peak top indicating an intensity $I_2$ which is a second highest intensity after the highest intensity $I_1$ within the pore size range of from 0.1 μm to 1 μm. A pore size at the first peak top is smaller than a pore size at the second peak top. The electrode satisfies the following formulae (1) to (3):

$$0.15 \leq I_2/I_1 \leq 0.40; \quad \text{formula (1)}$$

$$0.31 \leq X_1/(X_1+X_2+X_3) \leq 0.55; \text{ and} \quad \text{formula (2)}$$

$$0.7 \leq T_2/T_1 \leq 1.6, \quad \text{formula (3)}$$

where $X_1$, $X_2$, and $X_3$ are a Co content [mol %], an Ni content [mol %], and an Mn content [mol %] in the active material-containing layer, respectively. $T_1$ is a thickness [μm] of the current collector, and $T_2$ is a thickness [μm] of the active material-containing layer.

According to a second embodiment, an electrode group is provided. The electrode group includes a positive electrode and a negative electrode. The positive electrode includes a positive electrode active material-containing layer. The negative electrode includes a negative electrode active material-containing layer. The positive electrode is the electrode according to the first embodiment. The positive electrode active material-containing layer is the active material-containing layer included in the electrode according to the first embodiment.

According to a third embodiment, a battery is provided. The battery includes the electrode group according to the second embodiment and an electrolyte.

According to a fourth embodiment, a battery pack is provided. The battery pack includes the battery according to the third embodiment.

Hereinafter, embodiments will be described with reference to the drawings. Note that the same reference numerals are given to the same components throughout the embodiments, and a repetitive explanation will be omitted. In addition, each of the drawings is a schematic diagram for explaining the embodiment and facilitating the understanding thereof, and the shape, dimensions, ratio, etc. are different from those of an actual device in some places, but these can be appropriately changed in design in consideration of the following explanations and publicly known techniques.

First Embodiment

According to a first embodiment, an electrode is provided. The electrode includes a current collector and an active material-containing layer formed on the current collector. The active material-containing layer contains a lithium nickel cobalt manganese composite oxide and a lithium cobalt composite oxide. Pore size distribution obtained by mercury intrusion porosimetry for the active material-containing layer has a first peak top indicating a highest intensity $I_1$ within a pore size range of from 0.1 μm to 1 μm and a second peak top indicating an intensity $I_2$ which is a second highest intensity after the highest intensity $I_1$ within the pore size range of from 0.1 µm to 1 µm. A pore size at the first peak top is smaller than a pore size at the second peak top. The electrode satisfies the following formulae (1) to (3):

$$0.15 \leq I_2/I_1 \leq 0.40; \quad \text{formula (1)}$$

$$0.31 \leq X_1/(X_1+X_2+X_3) \leq 0.55; \text{ and} \quad \text{formula (2)}$$

$$0.7 \leq T_2/T_1 \leq 1.6, \quad \text{formula (3)}$$

where $X_1$, $X_2$, and $X_3$ are a Co content [mol %], an Ni content [mol %], and an Mn content [mol %] in the active material-containing layer, respectively, $T_1$ is a thickness [µm] of the current collector, and $T_2$ is a thickness [µm] of the active material-containing layer.

An example of the input/output characteristics of a battery is large current characteristics. The large current characteristics of a battery are largely affected by, for example, the properties of an electrolyte (e.g., an electrolyte solution) or a separator. It is considered that the biggest factor in determining the large current characteristics of a battery is present in a positive electrode and a negative electrode. Among these, it is considered that the influence of the characteristics of the positive electrode is particularly large.

In order to improve large current characteristics, for example, it is effective to reduce the particle size of an electrode active material to increase the specific surface area thereof. The inventors of the present invention took this measure on an electrode including an active material containing a lithium nickel cobalt manganese composite oxide and a lithium cobalt composite oxide. However, it has been found out that such a measure may promote the decomposition of an electrolyte. Thus, it has been found out that it is difficult for such a measure to improve both large current characteristics and life characteristics.

In view of these circumstances, the inventors of the present invention have realized the electrode according to the first embodiment as a result of extensive and intensive studies.

The pore size distribution obtained by mercury intrusion porosimetry for the active material-containing layer of the electrode according to the first embodiment, has the first peak top indicating the highest intensity within the pore size range of from 0.1 µm to 1 µm and the second peak top indicating the intensity $I_2$ which is the second highest intensity after the highest intensity $I_1$ within the pore size range of from 0.1 µm to 1 µm. The pore size at the first peak top (the highest intensity $I_1$) is smaller than the pore size at the second peak top (the intensity $I_2$). In other words, the pore size distribution of the active material-containing layer has the second peak top at the pore size larger than the pore size of the first peak top, which is a main peak, within the pore size range of from 0.1 µm to 1 µm. The electrode satisfies formula (1): $0.15 \leq I_2/I_1 \leq 0.40$. Although it is not desired to be bound by theory, it is considered that the active material-containing layer having such pore size distribution can, for example, include a sufficient number of pores in the vicinity of the lithium nickel cobalt manganese composite oxide and the lithium cobalt composite oxide contained in the active material-containing layer and include pores that connect these pores and are larger than these pores throughout the active material-containing layer. Thus, the active material-containing layer of the electrode according to the first embodiment in the state of being incorporated in a battery can sufficiently spread charge carriers, for example, an electrolyte containing $Li^+$ to the vicinity of the lithium nickel cobalt manganese composite oxide and the lithium cobalt composite oxide. As a result, in the battery including the electrode according to the first embodiment, it is possible to prevent lack of charge carriers in the vicinity of the lithium nickel cobalt manganese composite oxide and the lithium cobalt composite oxide resulting from charge and discharge and, in turn, prevent the progress of a nonuniform reaction caused by the lack of charge carriers although the electrode satisfies the above formula (2).

Further, the electrode that satisfies formula (3): $0.7 \leq T_2/T_1 \leq 1.6$ can exhibit high electro-conductivity throughout the active material-containing layer regardless of the distance from the current collector. This enables the electrode of the invention according to the first embodiment to prevent an electrode reaction from nonuniformly progressing due to poor electro-conductivity.

In this manner, although the electrode according to the first embodiment satisfies the above formula (2), the electrode can prevent a nonuniform electrode reaction caused by lack of charge carriers and a nonuniform electrode reaction caused by poor electro-conductivity. That is, the electrode according to the first embodiment can prevent the occurrence of a local electrode reaction in the active material-containing layer. This enables the electrode according to the first embodiment to reduce the lithium nickel cobalt manganese composite oxide and the lithium cobalt composite oxide used in locally excessive charge or discharge in the active material-containing layer. As a result, the electrode according to the first embodiment can prevent deterioration of the lithium nickel cobalt manganese composite oxide and the lithium cobalt composite oxide resulting from charge and discharge and, in turn, achieve excellent life characteristics.

Since the electrode according to the first embodiment can prevent the occurrence of a local electrode reaction, the electrode can facilitate the insertion and extraction of charge carriers by the lithium nickel cobalt manganese composite oxide and the lithium cobalt composite oxide. As described above, the electrode according to the first embodiment can exhibit high electro-conductivity regardless of the distance from the current collector. Thus, the electrode according to the first embodiment can achieve excellent input/output characteristics.

Note that, although a detailed reason is unclear, an electrode that does not satisfy formula (2): $0.31 \leq X_1/(X_1+X_2+X_3) \leq 0.55$ cannot improve input/output characteristics and life characteristics even if the electrode satisfies formulae (1) and (3).

For the reasons described above, the electrode according to the first embodiment can realize a battery capable of exhibiting excellent input/output characteristics and excellent life characteristics.

In an electrode having a thickness ratio $T_2/T_1$ of smaller than 0.7, the thickness $T_1$ [µm] of a current collector is too large relative to the thickness $T_2$ [µm] of an active material-containing layer. In this case, a volume energy density decreases. On the other hand, in an electrode having a thickness ratio $T_2/T_1$ of larger than 1.6, the thickness $T_1$ [µm] of a current collector is too small relative to the thickness $T_2$ [µm] of an active material-containing layer. In the active material-containing layer of such an electrode, an electro-conductivity gradient occurs according to the distance from the current collector, which results in poor uniformity in the electro-conductivity of the active material-containing layer.

The thickness ratio $T_2/T_1$ is preferably from 1.0 to 1.6. The electrode that satisfies the thickness ratio $T_2/T_1$ within this range can exhibit more excellent uniformity in the electro-conductivity of the active material-containing layer. The thickness ratio $T_2/T_1$ is more preferably from 1.1 to 1.55.

It is considered that, in an electrode having an intensity ratio $I_2/I_1$ of smaller than 0.15, an active material-containing layer does not include a sufficient number of pores that connect pores present in the vicinity of a lithium nickel cobalt manganese composite oxide and a lithium cobalt composite oxide. On the other hand, in an electrode having an intensity ratio $I_2/I_1$ of larger than 0.40, an active material-containing layer does not include a sufficient number of pores present in the vicinity of a lithium nickel cobalt manganese composite oxide and a lithium cobalt composite oxide. When these electrodes incorporated in batteries are used, charge and discharge causes lack of charge carriers in the vicinity of the lithium nickel cobalt manganese composite oxide and the lithium cobalt composite oxide. Thus, these electrodes cannot achieve excellent life characteristics.

The intensity ratio $I_2/I_1$ is preferably from 0.18 to 0.38. The electrode that satisfies the intensity ratio $I_2/I_1$ within this range enables a more sufficient number of charge carriers to be present in the vicinity of the lithium nickel cobalt manganese composite oxide and the lithium cobalt composite oxide when the electrode is incorporated in a battery. The intensity ratio $I_2/I_1$ is more preferably from 0.20 to 0.35.

It is considered that, in an electrode in which the pore size at the first peak top is equal to or larger than the pore size at the second peak top, an active material-containing layer does not include a sufficient number of pores present in the vicinity of a lithium nickel cobalt manganese composite oxide and a lithium cobalt composite oxide. When such an electrode incorporated in a battery is used, charge and discharge causes lack of charge carriers in the vicinity of the lithium nickel cobalt manganese composite oxide and the lithium cobalt composite oxide. Thus, such an electrode cannot achieve sufficient life characteristics.

Next, the electrode according to the first embodiment will be described in more detail.

The electrode according to the first embodiment can be used in a battery. The electrode according to the first embodiment can be used as, for example, a positive electrode in the battery. The battery may be, for example, a secondary battery, which can be repeatedly charged and discharged. An example of the secondary battery is a nonaqueous electrolyte battery. The nonaqueous electrolyte battery includes a nonaqueous electrolyte, and the nonaqueous electrolyte includes an electrolyte. Another example of the secondary battery is a battery including an electrolyte solution, the electrolyte solution containing an aqueous solvent and an electrolyte dissolved in the aqueous solvent.

The electrode according to the first embodiment includes the current collector and the active material-containing layer formed on the current collector.

The current collector can have, for example, a strip plane shape. The strip current collector can have a pair of long sides and a pair of short sides. The pair of long sides may be parallel to each other or may not be parallel to each other. Similarly, the pair of short sides may be parallel to each other or may not be parallel to each other.

The current collector can have, for example, a first surface and a second surface as a surface opposite to the first surface. The thickness $T_1$ [μm] of the current collector is, for example, a distance between the first surface and the second surface.

It is preferred that the thickness $T_1$ of the current collector be within a range of from 10 μm to 25 μm and a length $T_3$ of the pair of short sides of the current collector be within a range of from 20 mm to 100 mm. In the electrode of the preferred embodiment including such a current collector, the active material-containing layer can exhibit more uniform electro-conductivity. The thickness $T_1$ of the current collector is more preferably within a range of from 12 μm to 20 μm. The length $T_3$ of the pair of short sides of the current collector is more preferably within a range of from 50 mm to 95 mm.

The current collector is preferably, for example, aluminum foil or aluminum alloy foil containing at least one element selected from Mg, Ti, Zn, Mn, Fe, Cu, and Si.

The active material-containing layer can be formed on one surface or both surfaces of the current collector. For example, the active material-containing layer may be formed on any one of the first surface and the second surface of the current collector or may be formed on both of the first surface and the second surface of the current collector. The current collector may include a portion where the active material-containing layer is not formed. This portion can be used as, for example, a current-collecting tab. Alternatively, the electrode according to the first embodiment may include a current-collecting tab separate from the current collector.

The active material-containing layer can have, for example, a strip plane shape. The strip active material-containing layer can have a pair of long sides and a pair of short sides. The pair of long sides may be parallel to each other or may not be parallel to each other. Similarly, the pair of short sides may be parallel to each other or may not be parallel to each other.

The thickness $T_2$ of the active material-containing layer is preferably within a range of from 12 μm to 40 μm, and more preferably within a range of from 15 μm to 35 μm. Note that, when the active material-containing layer is formed on both of the surfaces of the current collector, the thickness $T_2$ of the active material-containing layer is an average thickness of the two active material-containing layers.

A length $T_4$ of the pair of short sides of the active material-containing layer is preferably within a range of from 20 mm to 90 mm. The length $T_4$ of the pair of short sides of the active material-containing layer is more preferably within a range of from 45 mm to 85 mm.

In particular, it is more preferred that the thickness $T_1$ of the current collector be within a range of from 10 μm to 25 μm and the length $T_4$ of the pair of short sides of the active material-containing layer be within a range of from 20 mm to 90 mm. The electrode of such an embodiment can further uniformize the progress of an electrode reaction in the active material-containing layer.

The active material-containing layer contains the lithium nickel cobalt manganese composite oxide and the lithium cobalt composite oxide.

The lithium nickel cobalt manganese composite oxide can have, for example, a composition represented by the general formula $Li_xNi_aCo_bMn_cM1_dO_2$, where $0.9 \leq x \leq 1.2$, $0.4 \leq a \leq 0.9$, $0.05 \leq b \leq 0.4$, $0.05 \leq c \leq 0.4$, $0 \leq d \leq 0.05$, $a+b+c+d=1$, and M1 is at least one selected from the group consisting of Mg, Al, Zr, Ti, and W.

A ratio $Y_2/Y_1$ in the lithium nickel cobalt manganese composite oxide is preferably 1 or more, where $Y_1$ is a Co content [mol %] in the lithium nickel cobalt manganese composite oxide, and $Y_2$ is an Ni content [mol %] in the lithium nickel cobalt manganese composite oxide. The ratio $Y_2/Y_1$ corresponds to a ratio a/b in the above general formula. Such a lithium nickel cobalt manganese composite oxide can achieve an excellent energy density in addition to excellent input/output characteristics and excellent life characteristics. The ratio $Y_2/Y_1$ is preferably from 1.2 to 5.0, and particularly preferably from 1.5 to 3.0.

The lithium nickel cobalt manganese composite oxide is preferably in the form of secondary particles produced through the aggregation of primary particles. That is, the active material-containing layer preferably contains secondary particles of the lithium nickel cobalt manganese composite oxide. Alternatively, the active material-containing layer may contain primary particles of the lithium nickel cobalt manganese composite oxide or may contain a mixture of the primary particles and the secondary particles.

The lithium cobalt composite oxide can have, for example, a composition represented by the general formula $Li_yCo_eM2_fO_2$, where $0.9 \leq y \leq 1.2$, $0.9 < e \leq 1$, $0 \leq f < 0.1$, $e+f=1$, and M2 is at least one selected from the group consisting of Mg, Al, Ti, Zr, and W.

The lithium cobalt composite oxide is preferably in the form of primary particles. That is, the active material-containing layer preferably contains primary particles of the lithium cobalt composite oxide. Alternatively, the active material-containing layer may contain secondary particles of the lithium cobalt composite oxide or may contain a mixture of the primary particles and the secondary particles.

The lithium nickel cobalt manganese composite oxide and the lithium cobalt composite oxide can serve as an active material in the active material-containing layer. To distinguish them from each other, the lithium nickel cobalt manganese composite oxide can be referred to as a first active material, whereas the lithium cobalt composite oxide can be referred to as a second active material.

The active material-containing layer may further contain a third active material different from the first and second active materials.

Examples of the third active material include a lithium manganese composite oxide (e.g., $Li_uMn_2O_4$ or $Li_uMnO_2$), a lithium nickel composite oxide (e.g., $Li_uNiO_2$), a lithium nickel cobalt composite oxide (e.g., $Li_uNi_{1-g}Co_gO_2$), a lithium manganese cobalt composite oxide (e.g., $Li_uMn_hCo_{1-h}O_2$), a lithium nickel cobalt aluminum composite oxide (e.g., $Li_uNi_{1-i-j}Co_iAl_jO_2$), and a lithium manganese nickel composite oxide having a spinel structure (e.g., $Li_uMn_{2-k}Ni_kO_4$). In the above, it is preferred that $0<u\leq1$, $0<g<1$, $0<h<1$, $0<i<1$, $0<j<1$, and $0<k<1$. These composite oxides can have Li inserted in and extracted from. As the third active material, one of these composite oxides may be used alone, or a mixture of two or more of these composite oxides may be used.

Among these composite oxides, the lithium manganese composite oxide ($Li_uMn_2O_4$), the lithium nickel cobalt composite oxide ($Li_uNi_{1-g}Co_gO_2$), and the lithium manganese cobalt composite oxide ($Li_uMn_hCo_{1-h}O_2$) are preferred. In the above, it is preferred that $0<u\leq1$, $0<g<1$, and $0<h<0$.

The proportion of the mass of the third active material to the sum of the masses of the first, second, and third active materials in the active material is preferably from 0% by mass to 10% by mass. The active material more preferably does not include the third active material.

The active material-containing layer can further contain an electro-conductive agent and a binder.

The electro-conductive agent can improve a current-collecting performance in the active material-containing layer. Further, the electro-conductive agent can have an effect of suppressing contact resistance between the active material and the current collector. Examples of the electro-conductive agent include carbonaceous materials, such as carbon black (e.g., acetylene black), graphite, carbon nanofibers, and carbon nanotubes. As the electro-conductive agent, one of these carbonaceous materials may be used alone, or a plurality of carbonaceous materials may be used.

The binder can bind the active material and the electro-conductive agent to the current collector. Examples of the binder include polytetrafluoroethylene (PTFE), polyvinylidene fluoride (PVdF), polyacrylic acid, polyacrylonitrile, and fluororubber.

The active material (the total amount of the lithium nickel cobalt manganese composite oxide and the lithium cobalt composite oxide, further including the mass of the third active material when the third active material is contained), the electro-conductive agent, and the binder are preferably blended in proportions of 80% by mass to 95% by mass, 3% by mass to 18% by mass, and 2% by mass to 17% by mass, respectively. When the amount of the electro-conductive agent is 3% by mass or more, the above-described effect can be exhibited. When the amount of the electro-conductive agent is 18% by mass or less, decomposition of the non-aqueous electrolyte on the surface of the electro-conductive agent during high-temperature storage can be reduced. When the amount of the binder is 2% by mass or more, sufficient electrode strength can be obtained. When the amount of the binder is 17% by mass or less, the blended amount of the binder, which is an insulating material in the active material-containing layer, can be reduced so as to reduce the internal resistance.

The electrode according to the first embodiment satisfies formula (2): $0.31 \leq X_1/(X_1+X_2+X_3) \leq 0.55$, where $X_1$, $X_2$, and $X_3$ are the Co content [mol %], the Ni content [mol %], and the Mn content [mol %] in the active material-containing layer, respectively. The electrode that satisfies the formula (2) can achieve more excellent life characteristics and more excellent input/output characteristics. The Co content, the Ni content, and the Mn content in the active material-containing layer preferably satisfy $0.33 \leq X_1/(X_1+X_2+X_3) \leq 0.5$, and more preferably satisfy $0.35 \leq X_1/(X_1+X_2+X_3) \leq 0.45$.

For example, when the active material-containing layer does not contain the third active material, the active material-containing layer can contain the lithium nickel cobalt manganese composite oxide and the lithium cobalt composite oxide at a mass ratio within a range of 80:20 to 96:4. In other words, the electrode according to the first embodiment can satisfy the above formula (2) and formula (4): $4 \leq Z_1/Z_2 \leq 24$, where $Z_1$ is the ratio [mass %] of the mass of the lithium nickel cobalt manganese composite oxide to the mass of the active material, and $Z_2$ is the ratio [mass ratio] of the mass of the lithium cobalt composite oxide to the mass of the active material. The mass ratio $Z_1/Z_2$ is preferably from 5 to 12, and more preferably from 5.5 to 9.

(Manufacturing Method)

The electrode according to the first embodiment can be produced, for example, through the following procedure.

First, as the active material, secondary particles of the lithium nickel cobalt manganese composite oxide and primary particles of the lithium cobalt composite oxide are prepared. At this time, care is taken so that the Ni content, the Co content, and the Mn content satisfy formula (2): $0.31 \leq X_1/(X_1+X_2+X_3) \leq 0.5$. The active material, the electro-conductive agent, and the binder are put into a solvent and mixed, for example, at the blending ratio described above to prepare a slurry. In the preparation of the slurry, a dispersion process applying a high shearing force is performed. Through this process, some of the secondary particles of the lithium nickel cobalt manganese composite oxide are disaggregated to produce primary particles, and the primary particles can fill gaps between particles of the particle mixture. Examples of the high shear dispersion process include a dispersion method using a thin-film spin system high-speed mixer and a dispersion method using a bead mill. An example of specific conditions will be described in Examples later.

Next, the slurry obtained as described above is applied to both surfaces or one surface of the current collector, and a coating film is dried. After the drying, a press process is performed. At this time, press conditions are adjusted so that formula (3): $0.7 \leq T_2/T_1 \leq 1.6$ is satisfied. The press conditions are determined also taking slurry preparation conditions into consideration. An example of specific conditions will be described in Examples later.

The electrode according to the first embodiment that satisfies the above formulae (1) to (3) can be obtained through such press.

<Measurement Method>

Hereinafter, each measurement method will be described.

[Pretreatment]

In measurement, an electrode to be measured is prepared.

The electrode included in a battery is prepared through pretreatment following the following procedure.

First, the battery is brought into a discharge state. The discharge state described herein refers to a state in which the battery is subjected to constant current discharge at a current value of 0.2 C or less in a 25° C. environment until the voltage reaches a discharge lower limit voltage.

Then, the battery in the discharge state is put into a glove box filled with argon gas. Next, the electrode to be measured is taken out of the battery inside the glove box. The electrode taken out is cleaned using chain carbonate such as ethyl methyl carbonate. Subsequently, the electrode is dried.

In this manner, the electrode to be measured can be obtained.

[Method for Acquiring Pore Size Distribution Using Mercury Intrusion Porosimetry]

A sample having a size of approximately 10 mm×25 mm is cut out of the electrode obtained as described above.

Then, the obtained sample is loaded into a measuring apparatus. Mercury intrusion porosimetry is performed on the loaded sample to obtain pore size distribution of the active material-containing layer.

Autopore 9520 model manufactured by Shimadzu Corporation is used as the measuring apparatus. The sample obtained as described above is folded and put in a measuring cell, and measured under conditions of an initial pressure of 20 kPa (the initial pressure of 20 kPa corresponds to approximately 3 psia and also corresponds to a pressure applied to a sample having a pore size of approximately 60 µm) and a maximum pressure of 414 Mpa (the maximum pressure of 414 Mpa corresponds to approximately 59986 psia and also corresponds to a pressure applied to a sample having a pore size of approximately 0.003 µm). The average value of three samples is used as a measurement result. For data arrangement, a pore specific surface area is calculated assuming that the pore has a cylindrical shape.

Note that an analysis principle of mercury intrusion porosimetry is based on Washburn's equation (1).

$$D = -4\gamma \cos \theta / P \qquad (1)$$

In equation (1), P is an applied pressure, D is a pore diameter, $\gamma$ is a surface tension of mercury (480 dyne·cm$^{-1}$), and $\theta$ is a contact angle between mercury and a pore wall surface, which is 140°. Since $\gamma$ and $\theta$ are constants, the relationship between the applied pressure P and the pore size D is obtained from the Washburn's equation. The pore size and pore volume distribution can be derived by measuring a mercury intrusion volume at this time. For details of the measurement method and the principle, refer to, for example, Non Patent Literature 1 ["BIRYUSHI HANDO BUKKU (Fine Particle Handbook)" by Genji Jimbo et al., First Edition, Asakura Publishing, Sep. 1, 1991, p. 151-152] and Non Patent Literature 2 ["HUNTAI BUSSEI SOKUTEI HO (Powder Properties Measuring Method)" edited by Sohachiro Hayakawa, First Edition, Asakura Publishing, Oct. 15, 1973, p. 257-259].

A pore size corresponding to a first peak top indicating a highest intensity $I_1$ within a pore size range of from 0.1 µm to 1 µm and a pore size corresponding to a second peak top indicating an intensity $I_2$ which is the second highest intensity after the highest intensity $I_1$ within the pore size range of from 0.1 µm to 1 µm can be recognized in the pore size distribution obtained in this manner. Further, the intensity ratio $I_2/I_1$ can be calculated from the highest intensity $I_1$ and the intensity $I_2$.

[Method for Quantifying Transition Metal Element Contained in Active Material-Containing Layer]

Another part of the electrode to be measured prepared as described above is put into an appropriate solvent and irradiated with ultrasonic waves. For example, an active material-containing layer can be peeled off from a current collector by placing an electrode body in ethyl methyl carbonate put in a glass beaker and vibrating the electrode body in an ultrasonic cleaner. Next, reduced-pressure drying is performed to dry the peeled active material-containing layer. The obtained active material-containing layer is pulverized with a mortar, etc. to obtain a powder containing components of the active material-containing layer, for example, an active material, an electro-conductive agent, and a binder. A liquid sample containing the components of the active material-containing layer can be prepared by dissolving the powder in acid. At this time, examples of the acid include hydrochloric acid, nitric acid, sulfuric acid, and hydrogen fluoride. A concentration of each element contained in the active material-containing layer can be determined by subjecting the liquid sample to ICP emission spectrometry.

Further, the Co content $X_1$ [mol %], the Ni content $X_2$ [mol %], and the Mn content $X_3$ [mol %] in the active material-containing layer can be calculated from this result.

[Method for Identifying Composite Oxide Contained in Active Material-containing Layer]

Another part of the electrode to be measured prepared as described above is cut out using an ion milling apparatus. The cross-section of the cut-out electrode is observed using a scanning electron microscope (SEM). Sampling of the sample is performed in an inert atmosphere of argon or nitrogen so as to prevent the sample from being exposed to the atmosphere.

Several particles are selected in a 3000-times SEM observation image. At this time, the selection is performed so that particle size distribution of the selected particles is made as wide as possible.

Next, elemental analysis using energy dispersive X-ray spectroscopy (EDX) is performed on each of the selected particles. Accordingly, it is possible to identify the kind and amount of an element other than Li among elements contained in each of the selected particles.

A crystal structure of a compound contained in each of the particles selected by the SEM can be identified by X-ray diffraction (XRD) measurement.

The measurement is performed in a measurement range of $2\theta = 10°$ to $90°$ using a CuK$\alpha$ ray as a radiation source.

Through this measurement, an X-ray diffraction pattern of the compound contained in each selected particle can be obtained.

As an apparatus for the powder X-ray diffraction measurement, SmartLab manufactured by Rigaku Corporation is used. Measurement conditions are as follows: Cu target: 45 kV 200 mA; Soller slit: 5° for both incidence and reception; step width: 0.02 deg; scan speed: 20 deg/min; semiconductor detector: D/teX Ultra 250; sample plate holder: flat glass sample plate holder (0.5 mm thick); and measurement range: $10° \leq 2\theta \leq 90°$. When another apparatus is used, measurement is performed through the following procedure. First, in the used apparatus, conditions under which results of measurement on a standard Si powder for powder X-ray diffraction are equivalent to measurement results (the peak intensity and the peak top position) obtained by SmartLab manufactured by Rigaku Corporation are found. The electrode is analyzed under these conditions.

The XRD measurement on the electrode can be performed by cutting out the electrode to be measured to the same extent as the area of a holder of a wide-angle X-ray diffractometer, and directly attaching the cut-out electrode to a glass holder to perform the measurement. At this time, an XRD pattern is measured in advance according to the type of metal foil of the current collector, and a position at which a peak derived from the current collector appears is grasped. The presence or absence of a peak of a mixture such as an electro-conductive agent and a binder is also grasped in advance. When the peak of the current collector and a peak of the active material overlap each other, it is desirable to perform the measurement after the active material is peeled off from the current collector. This is for separating overlapping peaks when quantitatively measuring the peak intensity. It is needless to say that if these are already grasped in advance, this operation can be omitted. Although the electrode may be physically peeled off, the electrode is easily peeled off by applying ultrasonic waves thereto in a solvent. By measuring the electrode collected in this manner, wide-angle X-ray diffraction measurement of the active material can be performed.

For the particles contained in the electrode, the composition and the crystal structure of the compounds contained in the electrode can be identified by a combination of the results of the identification of the compositions using the SEM and the EDX, the identification of the crystal structure using the XRD, and the ICP emission spectrometry described above.

From this result, it is possible to calculate the Co content $Y_1$ [mol %] and the Ni content $Y_2$ [mol %] in the lithium nickel cobalt manganese composite oxide contained in the active material-containing layer.

[Method for Determining Particle Shape and Average Particle Size of Composite Oxide]

In the SEM-EDX observation on the electrode described above, an image of the composite oxide is obtained at a magnification of 3000 times. A particle group in which contact of primary particles can be recognized in the obtained view field is defined as a secondary particle.

The size of the primary particle is obtained from the diameter of a minimum circle corresponding to the primary particle. Specifically, particle size measurement is performed 10 times in the SEM image obtained at a magnification of 3000 times, and the average of the minimum circle diameters obtained in the respective measurements is used as the primary particle size. In the calculation of the average, the maximum value and the minimum value of the particle size in the 10-times measurement are not used.

The secondary particle size is measured in the same manner as the primary particle. That is, the diameter of a minimum circle corresponding to the secondary particle is obtained. Specifically, particle size measurement is performed 10 times in the SEM image obtained at a magnification of 3000 times, and the average of the minimum circle diameters obtained in the respective measurements is used as the secondary particle size. In the calculation of the average, the maximum value and the minimum value of the particle size in the 10-times measurement are not used.

[Method for Measuring Thickness of Current Collector and Thickness of Active Material-containing Layer]

The thickness $T_1$ of the current collector and the thickness $T_2$ of the active material-containing layer, the current collector and the active material-containing layer being included in the electrode, are measured using a coating thickness gauge. As the coating thickness gauge, a coating thickness gauge having a function of applying a load of from 15 g to 20 g per 1 cm$^2$ to a principal surface of an object to be measured and a function of measuring the length in the state of applying such a load is used. By using such a coating thickness gauge, it is possible to measure each thickness with lifting and strain of the electrode eliminated.

Specifically, the measurement is performed through the following procedure.

First, the thickness of the electrode to be measured is measured at five different positions using the coating thickness gauge. The average value of the measurement results is used as a thickness $T_t$ [μm] of the electrode.

Next, the active material-containing layer is peeled off from the current collector of the electrode to be measured. For example, as described above, the active material-containing layer can be peeled off by applying ultrasonic waves thereto in a solvent. In this manner, the current collector included in the electrode can be obtained.

Next, the thickness of the current collector is measured at five different positions using the coating thickness gauge. The average value of the measurement results is used as the thickness $T_1$ [μm] of the current collector.

Next, the thickness $T_1$ of the current collector is subtracted from the thickness $T_t$ of the electrode. When the active material-containing layer is formed only on one surface of the current collector, the value obtained in this manner is used as the thickness $T_2$ [μm] of the active material-containing layer. When the active material-containing layer is formed only on both surfaces of the current collector, the quotient obtained by dividing the value obtained in this manner by 2 is used as the thickness $T_2$ [μm] of the active material-containing layer.

[Method for Calculating Short Side and Long Side of Current Collector and Method for Calculating Short Side and Long Side of Active Material-containing Layer]

When the pair of short sides of the current collector have different thicknesses, the average value of the two values is calculated as the length $T_3$ of the pair of short sides. Similarly, when the pair of long sides of the current collector have different thicknesses, the average value of the two values is calculated as the length of the pair of long sides.

When the pair of short sides of the active material-containing layer have different thicknesses, the average value of the two values is calculated as the length $T_4$ of the pair of short sides. Similarly, when the pair of long sides of the active material-containing layer have different thicknesses, the average value of the two values is calculated as the length of the pair of long sides.

Next, several examples of the pore size distribution of the active material-containing layer will be described with reference to the drawings.

FIG. 1 shows pore size distribution (solid line) of an active material-containing layer included in an electrode of an example (first example) according to the first embodiment and pore size distribution (dotted line) of an active material-containing layer included in an electrode of a reference example.

The active material-containing layer of the electrode of the first example having the pore size distribution indicated by the solid line of FIG. 1 contains a lithium nickel cobalt manganese composite oxide and a lithium cobalt composite oxide at a mass ratio of 90:10. The thickness $T_2$ of the active material-containing layer of the electrode of the first example is 20 μm. The active material-containing layer of the electrode of the reference example having the pore size distribution indicated by the dotted line has the same composition as that of the active material-containing layer of the electrode of the first example. However, the thickness $T_2$ of the active material-containing layer of the electrode of the reference example is 40 μm, which is approximately twice the thickness $T_2$ of the active material-containing layer of the electrode of the first example.

The thickness $T_1$ of the current collector is 15 μm in both of the electrode of the first example and the electrode of the reference example.

The electrode of the reference example was produced under conditions in which the rotation speed of the bead mill in the slurry dispersion process is 1.5 times that of the electrode of the first example and the load in the press process is 1.4 times that of the electrode of the first example. In addition, the electrode of the reference example was produced with an application amount of the slurry changed from that in the production of the electrode of the first example.

In the pore size distribution indicated by the solid line in FIG. 1, the first peak top $P_1$ indicating the highest intensity $I_1$ and the second peak top $P_2$ indicating the intensity $I_2$ which is the second highest intensity after the highest intensity $I_1$ can be recognized within the pore size range of from 0.1 μm to 1 μm. The intensity ratio $I_2/I_1$ in the pore size distribution indicated by the solid line is 0.38. On other hand, in the pore size distribution indicated by the dotted line in FIG. 1, although a first peak top $P_1'$ indicating the highest intensity $I_1$ can be recognized within the pore size range of from 0.1 μm to 1 μm, a peak top indicating the second highest intensity cannot be recognized within this pore size range.

A battery in which the electrode of the first example is incorporated can exhibit more excellent input/output characteristics and more excellent life characteristics than a battery in which the electrode of the reference example is incorporated. It is considered that this is because the electrode of the first example can prevent deterioration of the lithium nickel cobalt manganese composite oxide and the lithium cobalt composite oxide resulting from charge and discharge and exhibit high electro-conductivity due to the reasons described above. On the other hand, it is considered that, in the electrode of the reference example, although the active material-containing layer includes pores in the vicinity of the lithium nickel cobalt manganese composite oxide and the lithium cobalt composite oxide, pores that connect these pores and are larger than these pores are not included throughout the active material-containing layer. Thus, in the battery including the electrode of the reference example, charge and discharge causes lack of charge carriers in the vicinity of the lithium nickel cobalt manganese composite oxide and the lithium cobalt composite oxide.

Next, the electrode according to the first embodiment will be described in more detail with reference to the drawings.

Figure 2:
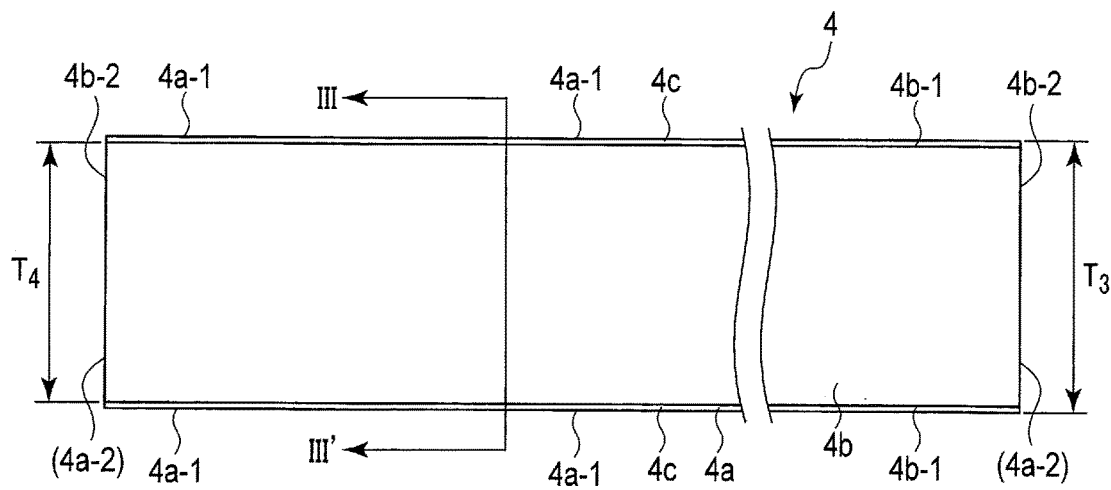
FIG. 2 is a schematic plan view of an electrode of an example according to the first embodiment.
Figure 3:
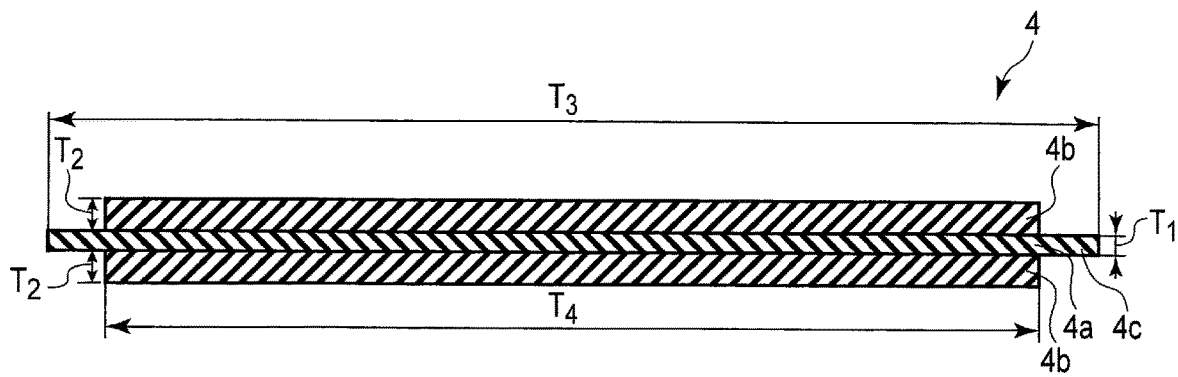
FIG. 3 is a schematic cross-sectional view of the electrode shown in FIG. 2 taken along line III-III'.

FIG. 2 is a schematic plan view of an electrode of an example according to the first embodiment. FIG. 3 is a schematic cross-sectional view of the electrode shown in FIG. 2 taken along line III-III'.

An electrode 4 shown in FIGS. 2 and 3 includes a current collector 4a and an active material-containing layer 4b formed on both surfaces of the current collector 4a.

As shown in FIGS. 2 and 3, the current collector 4a has a strip shape having a pair of long sides 4a-1 extending in the right-left direction in FIG. 2 and a pair of short sides 4a-2. The pair of short sides 4a-2 of the current collector 4a has a length $T_3$ [mm]. Note that, in FIG. 2, since the pair of short sides 4a-2 is hidden behind the active material-containing layer 4b, a reference sign thereof is shown in parentheses.

Similarly, as shown in FIGS. 2 and 3, the active material-containing layer 4b has a strip shape having a pair of long sides 4b-1 extending in the right-left direction in FIG. 2 and a pair of short sides 4b-2. The pair of short sides 4b-2 of the active material-containing layer 4b has a length $T_4$ [mm].

As is apparent from FIGS. 2 and 3, the current collector 4a includes two portions 4c where the active material-containing layer is not formed on the surface. Each of the portions 4c can serve as a current-collecting tab. As shown in FIG. 2, each of the current-collecting tabs 4c extends in a direction in which the long sides 4a-1 of the current collector 4a and the long sides 4b-1 of the active material-containing layer 4b extend. Each of the current-collecting tabs 4c includes one of the long sides 4a-1 of the current collector 4a.

As shown in FIG. 3, the current collector 4a has the thickness $T_1$ [μm], and the active material-containing layer 4b has the thickness $T_2$ [μm].

According to the first embodiment, the electrode is provided. The electrode includes the current collector and the active material-containing layer formed on the current collector. The active material-containing layer contains the lithium nickel cobalt manganese composite oxide and the lithium cobalt composite oxide. The pore size distribution obtained by mercury intrusion porosimetry for the active material-containing layer has the first peak top indicating the highest intensity $I_1$ within the pore size range of from 0.1 μm to 1 μm and the second peak top indicating the intensity $I_2$ which is the second highest intensity after the highest intensity $I_1$ within the pore size range of from 0.1 μm to 1 μm. The pore size at the first peak top is smaller than the pore size at the second peak top. The electrode satisfies the following formulae (1) to (3): formula (1): $0.15 \leq I_2/I_1 \leq 0.40$; formula (2): $0.31 \leq X_1/(X_1+X_2+X_3) \leq 0.55$; and formula (3): $0.7 \leq T_2/T_1 \leq 1.6$. When the electrode incorporated in a battery is used, the electrode can prevent deterioration of the lithium nickel cobalt manganese composite oxide and the lithium cobalt composite oxide resulting from charge and discharge and exhibit high electro-conductivity. As a result, the electrode according to the first embodiment can realize a battery capable of exhibiting excellent input/output characteristics and excellent life characteristics.

Second Embodiment

According to a second embodiment, an electrode group is provided. The electrode group includes a positive electrode and a negative electrode. The positive electrode includes a positive electrode active material-containing layer. The negative electrode includes a negative electrode active material-containing layer. The positive electrode is the electrode according to the first embodiment. The positive electrode active material-containing layer is the active material-containing layer included in the electrode according to the first embodiment.

Since the electrode group according to the second embodiment includes the electrode according to the first embodiment, the electrode group can realize a battery capable of exhibiting excellent input/output characteristics and excellent life characteristics.

Hereinafter, the electrode group according to the second embodiment will be described in more detail.

The electrode group according to the second embodiment includes the positive electrode and the negative electrode.

The positive electrode is the electrode according to the first embodiment. Thus, the positive electrode included in the electrode group according to the second embodiment includes the current collector and the active material-containing layer that are included in the electrode according to the first embodiment. Hereinafter, for distinction from members of the negative electrode, the current collector, the active material-containing layer, the current-collecting tab, and the active material that can be included in the electrode according to the first embodiment are referred to as a positive electrode current collector, a positive electrode active material-containing layer, a positive electrode current-collecting tab, and a positive electrode active material, respectively. For details of the positive electrode, refer to the description of the electrode according to the first embodiment.

The negative electrode can include, for example, a negative electrode current collector and a negative electrode active material-containing layer formed on the negative electrode current collector.

The negative electrode current collector can have, for example, a strip plane shape. The strip negative electrode current collector can have a pair of long sides and a pair of short sides. The pair of long sides may be parallel to each other or may not be parallel to each other. Similarly, the pair of short sides may be parallel to each other or may not be parallel to each other.

A thickness of the negative electrode current collector is preferably from 10 μm to 25 μm, and more preferably from 12 μm to 20 μm.

A length $T_6$ of the pair of short sides of the negative electrode current collector is preferably within a range of from 20 mm to 100 mm. The length $T_6$ of the pair of short sides of the negative electrode current collector is more preferably within a range of from 50 mm to 95 mm.

The negative electrode current collector can have, for example, a first surface and a second surface as a surface opposite to the first surface. The negative electrode active material-containing layer can be formed only on one surface of the negative electrode current collector or can be formed on both surfaces of the negative electrode current collector. The negative electrode current collector can include a portion where the negative electrode active material-containing layer is not formed on the surface. This portion can serve as, for example, a negative electrode current-collecting tab. Alternatively, the negative electrode may include a negative electrode current-collecting tab separate from the negative electrode current collector.

The negative electrode active material-containing layer can have, for example, a strip plane shape. In other words, the negative electrode active material-containing layer can have a principal surface having a strip plane shape. The strip negative electrode active material-containing layer can have a pair of long sides and a pair of short sides. The pair of long sides may be parallel to each other or may not be parallel to each other. Similarly, the pair of short sides may be parallel to each other or may not be parallel to each other.

A thickness of the negative electrode active material-containing layer is preferably within a range of from 12 μm to 35 μm, and more preferably within a range of from 15 μm to 30 μm. Note that, when the negative electrode active material-containing layer is formed on both of the surfaces of the current collector, the thickness of the negative electrode active material-containing layer is an average thickness of the two active material-containing layers.

A length $T_5$ of the pair of short sides of the negative electrode active material-containing layer is preferably within a range of from 20 mm to 95 mm. The length $T_5$ of the pair of short sides of the active material-containing layer is more preferably within a range of from 50 mm to 90 mm.

The electrode group according to the second embodiment may further include a separator. The separator is located, for example, between the positive electrode active material-containing layer and the negative electrode active material-containing layer in the electrode group. The separator can play a role of preventing contact between the positive electrode active material-containing layer and the negative electrode active material-containing layer, thereby preventing current passage between these layers.

The electrode group can have various structures. For example, the electrode group can have a stack-type structure. The electrode group having the stack-type structure can be obtained by, for example, stacking a plurality of positive electrodes and a plurality of negative electrodes with a separator interposed between the positive electrode active material-containing layer and the negative electrode active material-containing layer. Alternatively, the electrode group can have a wound-type structure. The electrode group having the wound-type structure can be obtained by, for example, stacking one separator, one positive electrode, another separator, and one negative electrode in this order to constitute a stack, and winding the stack with the negative electrode located on the outer side.

In the electrode group according to the second embodiment, a ratio Wc/Wa is preferably from 1.25 to 1.75, where Wc is a mass per unit area (g/m²) of the positive electrode active material-containing layer, and Wa is a mass per unit area (g/m²) of the negative electrode active material-containing layer. The electrode group of this embodiment has excellent life characteristics. The ratio Wc/Wa is more preferably from 1.3 to 1.6.

The electrode group according to the second embodiment preferably satisfies formula (4): $T_4<T_5$. In formula (4), $T_4$ is the length [mm] of the pair of short sides of the positive electrode active material-containing layer. That is, the length $T_4$ corresponds to the length $T_4$ described in the first embodiment. $T_5$ is the length [mm] of the pair of short sides of the negative electrode active material-containing layer. In other words, in this embodiment, the width (the length of the short side) of the negative electrode active material-containing layer is larger than the width (the length of the short side) of the positive electrode active material-containing layer. The electrode group according to this embodiment can achieve excellent life characteristics. A length ratio $T_4/T_5$ is more preferably 0.8 or more and less than 1.0.

In the electrode group according to the second embodiment, a thickness ratio $T_7/T_8$ is preferably within a range of from 0.7 to 1.3, where $T_7$ is the thickness [μm] of the positive electrode, that is, the sum of the thickness of the positive electrode current collector and the thickness of the positive electrode active material-containing layer, and $T_8$ is the thickness [μm] of the negative electrode, that is, the sum of the thickness of the negative electrode current collector and the thickness of the negative electrode active material-containing layer. The electrode group according to this embodiment can achieve more excellent input/output characteristics. The thickness ratio $T_7/T_8$ is more preferably within a range of from 0.8 to 1.0.

The electrode group according to the second embodiment can further include a negative electrode terminal and a positive electrode terminal. A part of the negative electrode terminal is electrically connected to a part of the negative electrode so that the negative electrode terminal can serve as a conductor for electrons to move between the negative electrode and an external terminal. The negative electrode terminal can be connected to, for example, the negative electrode current collector, particularly to the negative electrode current-collecting tab. Similarly, a part of the positive electrode terminal is electrically connected to a part of the positive electrode so that the positive electrode terminal can serve as a conductor for electrons to move between the positive electrode and an external circuit. The positive electrode terminal can be connected to, for example, the positive electrode current collector, particularly to the positive electrode current-collecting tab.

The electrode group according to the second embodiment can be used in a battery. The battery can be, for example, a secondary battery, which can be repeatedly charged and discharged.

Next, each member that can be included in the electrode group according to the second embodiment will be described in more detail.

(Positive Electrode)

For materials of the positive electrode, refer to the description of the electrode according to the first embodiment.

(Negative Electrode)

The negative electrode current collector is preferably formed of aluminum foil or aluminum alloy foil containing at least one element selected from the group consisting of Mg, Ti, Zn, Mn, Fe, Cu, and Si.

The negative electrode active material-containing layer can contain a negative electrode active material. The negative electrode active material-containing layer may further contain an electro-conductive agent and a binder in addition to the negative electrode active material.

As the negative electrode active material, for example, at least one selected from the group consisting of lithium titanate having a spinel-type crystal structure, lithium titanate having a ramsdellite-type crystal structure, a titanium-containing oxide having a monoclinic crystal structure (monoclinic β-type), a titanium-containing oxide having an anatase-type crystal structure, a niobium titanium composite oxide having a monoclinic crystal structure, and an Na-containing niobium titanium composite oxide having an orthorhombic-type crystal structure can be used.

The lithium titanate having a spinel-type crystal structure can have, for example, a composition represented by $Li_{4+x1}Ti_5O_{12}$ (x1 varies in a range of 0≤x1≤3 due to a charge/discharge reaction).

The lithium titanate having a ramsdellite-type crystal structure can have, for example, a composition represented by $Li_{2+y1}Ti_3O_7$ (y1 varies in a range of −1≤y1≤3 due to a charge/discharge reaction).

An example of the titanium-containing oxide having a monoclinic crystal structure is titanium dioxide having a composition of $TiO_2$. A part of Ti of the titanium dioxide may be substituted with another metal element. Examples of the other metal element include Al, Sn, Nb, and Ta. When the metal element other than Ti is contained, this oxide can also be called a titanium-containing composite oxide having a monoclinic crystal structure.

An example of the titanium-containing oxide having an anatase-type crystal structure is titanium dioxide having a composition of $TiO_2$. A part of Ti of the titanium dioxide may be substituted with another metal element. Examples of the other metal element include Al, Sn, Nb, and Ta.

The niobium titanium composite oxide having a monoclinic crystal structure can have, for example, a composition represented by the general formula $Ti_{1−x2}M\alpha_{x2}Nb_{2−y2}M\beta_{y2}O_{7−\delta2}$. In this general formula, each of Mα and Mβ is at least one selected from the group consisting of Mg, Fe, Ni, Co, W, Ta, and Mo. The element Mα and the element Mβ may be same as each other or may be different from each other. In the above general formula, the subscripts are within ranges of 0≤x2<1, 0≤y2<1, and −0.3≤δ2≤0.3. A specific example of the niobium titanium composite oxide having a monoclinic crystal structure is a composite oxide having a composition represented by the general formula $Li_{v1}Nb_2TiO_7$ (0≤v1≤5).

The Na-containing niobium titanium composite oxide can be a composite oxide containing Na, Nb, and Ti. The Na-containing niobium titanium composite oxide having an orthorhombic-type crystal structure can have a composition represented by the general formula $Li_{2+v2}Na_{2−y3}M1_{x3}Ti_{6−y3−z3}Nb_{y3}M2_{z3}O_{14+\delta3}$. In this general formula, M1 is at least one selected from the group consisting of Cs, K, Sr, Ba, and Ca. M2 is at least one selected from the group consisting of Sn, V, Ta, Mo, W, Fe, Co, and Mn. The subscripts are within ranges of 0≤v2≤4; 0≤x3<2; 0.1<y3<0.8; 0≤z3<3; and −0.5≤δ3≤0.5.

In particular, the negative electrode active material-containing layer preferably contains at least one titanium-containing composite oxide selected from the group consisting of a spinel-type lithium titanium composite oxide and an orthorhombic-type titanium-containing composite oxide. The electrode group according to this embodiment can achieve more excellent input/output characteristics.

The electro-conductive agent can improve a current-collecting performance in the negative electrode active material-containing layer. Further, the electro-conductive agent can have an effect of suppressing contact resistance between the negative electrode active material and the negative electrode current collector. Examples of the electro-conductive agent include carbonaceous materials, such as carbon black such as acetylene black, graphite, carbon nanofibers, and carbon nanotubes. Among these materials, graphite and carbon nanofibers are preferred because a negative electrode active material-containing layer having a low resistance is easily formed. Graphite and carbon nanofibers more easily enter between negative electrode active material particles than carbon black such as acetylene black and can provide electro-conductivity in the thickness direction of the negative electrode active material-containing layer. Thus, graphite and carbon nanofibers can achieve high input/output characteristics. As the electro-conductive agent, one of these carbonaceous materials may be used alone, or a plurality of carbonaceous materials may be used.

The binder can have an effect of binding the negative electrode active material, the electro-conductive agent, and the negative electrode current collector. Examples of the binder include polytetrafluoroethylene (PTFE), polyvinylidene fluoride (PVdF), fluororubber, styrene-butadiene rubber, acrylic resin and a copolymer thereof, polyacrylic acid, and polyacrylonitrile.

The negative electrode active material-containing layer preferably contains the negative electrode active material at a weight ratio of from 70% by mass to 96% by mass, the electro-conductive agent at a weight ratio of from 2% by mass to 28% by mass, and the binder at a mass ratio of from 2% by mass to 28% by mass. The negative electrode active material-containing layer containing the electro-conductive agent at a mass ratio of 2% by mass or more can exhibit a more excellent current-collecting performance. As a result, more excellent large current characteristics can be achieved. The negative electrode active material-containing layer containing the binder at a mass ratio of 2% by mass or more can exhibit an excellent binding property between the negative electrode active material-containing layer and the current collector, and can achieve more excellent cycle characteristics. On the other hand, in view of high capacity, the amount of each of the electro-conductive agent and the binder is preferably 28% by mass or less.

(Separator)

As the separator, for example, a porous film formed of a material such as polyethylene, polypropylene, polyethylene terephthalate, cellulose, or polyvinylidene fluoride (PVdF), a synthetic resin non-woven fabric, etc. can be used. Furthermore, a separator having inorganic compounds applied onto the porous film can also be used.

(Positive Electrode Terminal)

The positive electrode terminal is formed of, for example, a material that is electrically stable and conductive when a potential with respect to an oxidation-reduction potential of lithium is in a range of from 3.0 V to 4.5 V. The positive electrode terminal is preferably made of aluminum or an aluminum alloy containing an element such as Mg, Ti, Zn, Mn, Fe, Cu, or Si. The positive electrode terminal is preferably formed of the same material as that of the positive electrode current collector in order to reduce contact resistance with the positive electrode current collector.

(Negative Electrode Terminal)

The negative electrode terminal is formed of a material that is electrically stable and conductive when a potential with respect to an oxidation-reduction potential of lithium is in a range of from 0.8 V to 3.0 V. The negative electrode terminal is preferably formed of aluminum or an aluminum alloy containing an element such as Mg, Ti, Zn, Mn, Fe, Cu, or Si. The negative electrode terminal is preferably formed of the same material as that of the negative electrode current collector in order to reduce contact resistance with the negative electrode current collector.

<Measurement Method>

Hereinafter, each measurement method will be described.

[Method for Identifying Active Material]

The positive electrode active material contained in the positive electrode active material-containing layer can be identified using the measurement method described in the first embodiment. The negative electrode active material contained in the negative electrode active material-containing layer can also be identified through the same procedure.

[Method for Measuring Thickness]

For the positive electrode and the negative electrode, the thickness of the current collector and the thickness of the active material-containing layer are measured using the measurement method described in the first embodiment.

[Method for Measuring Mass Per Unit Area of Positive Electrode Active Material-containing Layer and Mass Per Unit Area of Negative Electrode Active Material-containing Layer]

A positive electrode to be measured is prepared through the procedure described above. Then, a sample having a size of approximately 5 mm×5 mm is cut out of the prepared positive electrode. Then, a mass of the sample is measured. The measured mass is denoted by Ws [g]. Then, a positive electrode active material-containing layer is peeled off from the sample through the procedure described above so that only a positive electrode current collector is left. A mass of the positive electrode current collector is measured. The measured mass is denoted by Wsc [g].

A mass Wsa [g] of the positive electrode active material-containing layer included in the sample can be obtained by subtracting the mass Wsc from the mass Ws.

When the positive electrode active material-containing layer is formed on both surfaces of the positive electrode current collector, a mass per unit area [g/m$^2$] of the positive electrode active material-containing layer can be obtained by dividing the mass Wsa by the area of the sample and further dividing the obtained value by 2.

When the positive electrode active material-containing layer is formed on one surface of the positive electrode current collector, the mass We per unit area [g/m$^2$] of the positive electrode active material-containing layer can be obtained by dividing the mass Wsa by the area of the sample.

A mass Wa per unit area [g/m$^2$] of the negative electrode active material-containing layer can also be obtained through the same procedure.

Next, the electrode group according to the second embodiment will be described in more detail with reference to the drawings.

Figure 4:
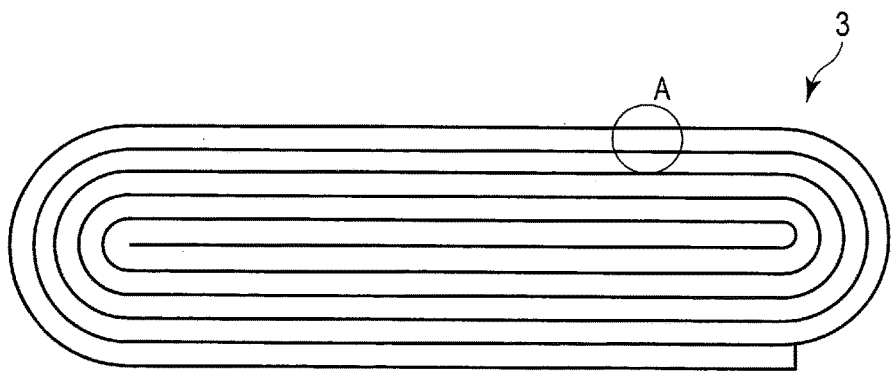
FIG. 4 is a schematic cross-sectional view of an electrode group of an example according to a second embodiment.
Figure 5:
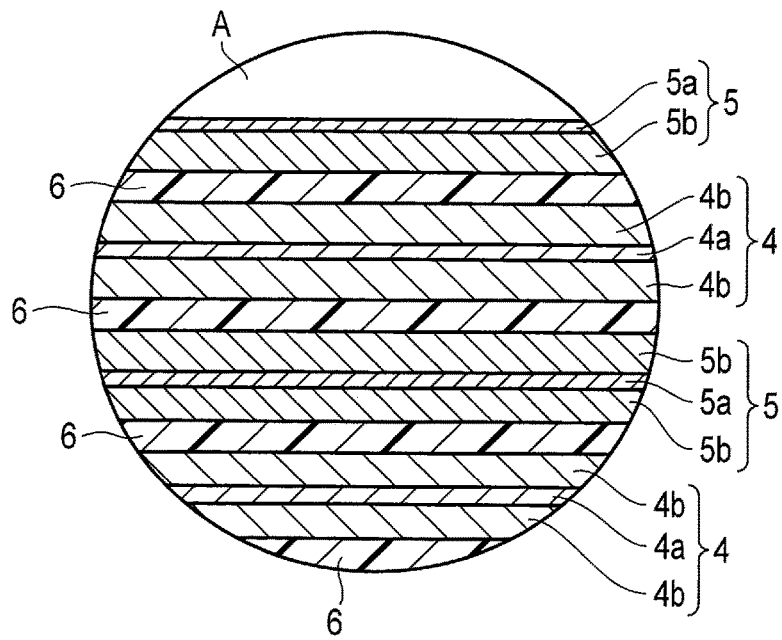
FIG. 5 is an enlarged cross-sectional view of a portion A of the electrode group shown in FIG. 4.
Figure 6:
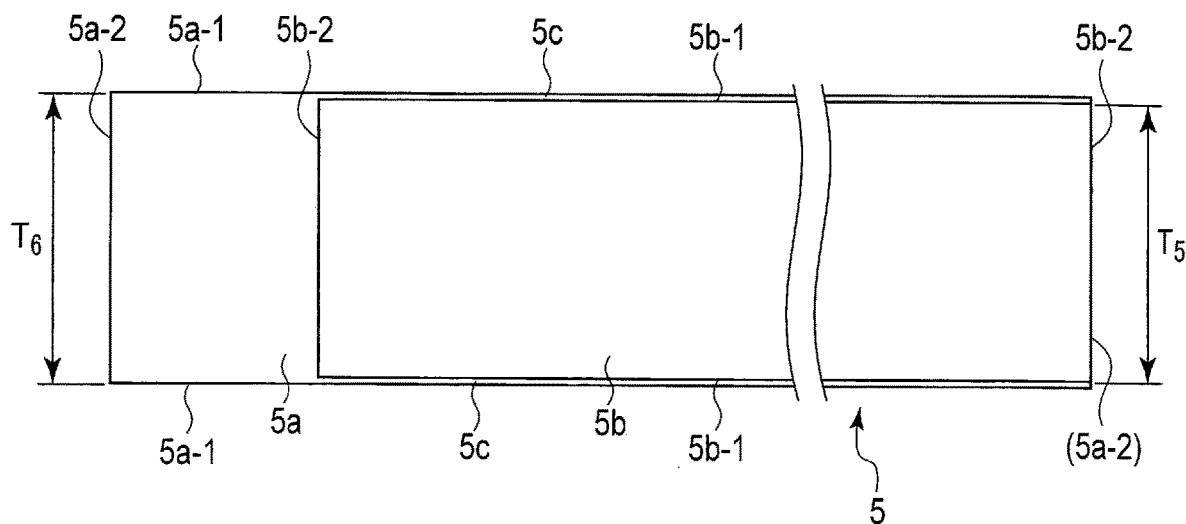
FIG. 6 is a schematic plan view of a negative electrode included in the electrode group shown in FIGS. 4 and 5.

FIG. 4 is a schematic cross-sectional view of an electrode group of an example according to the second embodiment. FIG. 5 is an enlarged cross-sectional view of a portion A of the electrode group shown in FIG. 4. FIG. 6 is a schematic plan view of a negative electrode included in the electrode group shown in FIGS. 4 and 5.

An electrode group 3 shown in FIGS. 4 and 5 includes a positive electrode 4 shown in FIG. 5, a negative electrode 5 shown in FIGS. 5 and 6, and two separators 6 shown in FIG. 5.

As shown in FIG. 4, the electrode group 3 is a flat wound-type electrode group. As shown in FIG. 5, the flat wound-type electrode group 3 is formed by spirally winding a stack in which the negative electrode 5, the separator 6, the positive electrode 4, and the separator 6 are stacked in this order from the outer side and press-molding the stack.

The positive electrode 4 has the same structure as that of the electrode 4 of the example described above with reference to FIGS. 2 and 3.

As shown in FIGS. 5 and 6, the negative electrode 5 includes a negative electrode current collector 5a and a negative electrode active material-containing layer 5b. In the outermost portion of the negative electrode 5, the negative electrode active material-containing layer 5b is formed on one inner surface of the negative electrode current collector 5a as shown in FIG. 5. FIG. 6 shows, on the left side thereof, the outermost portion of the negative electrode 5 in the electrode group 3. In the other portions of the negative electrode 5, the negative electrode active material-containing layer 5b is formed on both surfaces of the negative electrode current collector 5a.

As shown in FIG. 6, the negative electrode current collector 5a has a strip shape having a pair of long sides 5a-1 extending in the right-left direction in FIG. 6 and a pair of short sides 5a-2. The pair of short sides 5a-2 of the negative electrode current collector 5a has a length $T_6$ [mm]. Note that, in FIG. 6, since one of the short sides 5a-2 is hidden behind the negative electrode active material-containing layer 5b, a reference sign thereof is shown in parentheses.

Similarly, as shown in FIG. 6, the negative electrode active material-containing layer 5b has a strip shape having a pair of long sides 5b-1 extending in the right-left direction in FIG. 6 and a pair of short sides 5b-2. The pair of short sides 5b-2 of the negative electrode active material-containing layer 5b has a length $T_5$ [mm].

As is apparent from FIG. 6, the negative electrode current collector Sa includes two portions 5c where the negative electrode active material-containing layer 5b is not formed on the surface. Each of the portions 5c can serve as a negative electrode current-collecting tab. As shown in FIG. 6, each of the negative electrode current-collecting tabs Sc extends in a direction in which the long sides 5a-1 of the negative electrode current collector 5a and the long sides 5b-1 of the negative electrode active material-containing layer Sb extend. Each of the negative electrode current-collecting tabs 5c includes one of the long sides 5a-1 of the negative electrode current collector 5a.

The electrode group according to the second embodiment includes the electrode according to the first embodiment. Thus, the electrode group according to the second embodiment can realize a battery capable of exhibiting excellent input/output characteristics and excellent life characteristics.

Third Embodiment

According to a third embodiment, a battery is provided. This battery includes the electrode group according to the second embodiment and an electrolyte.

Since the battery according to the third embodiment includes the electrode group according to the second embodiment, the battery can exhibit excellent input/output characteristics and excellent life characteristics.

The battery according to the third embodiment can, for example, be repeatedly charged and discharged. Thus, the battery according to the third embodiment can also be referred to as a secondary battery.

The battery according to the third embodiment is, for example, a nonaqueous electrolyte battery. The nonaqueous electrolyte battery includes a nonaqueous electrolyte, and the nonaqueous electrolyte includes an electrolyte. Alternatively, the battery according to the third embodiment may be a battery including an electrolyte solution, the electrolyte solution containing an aqueous solvent and an electrolyte dissolved in the aqueous solvent.

Next, the battery according to the third embodiment will be described in more detail.

The battery according to the third embodiment includes the electrode group according to the second embodiment and the electrolyte.

The electrode group is the electrode group according to the second embodiment. In the electrode group, at least a part of a principal surface of a negative electrode active material-containing layer can face a positive electrode active material-containing layer, for example, as shown in FIG. 5.

In the battery according to the third embodiment, a ratio A/Sa is preferably from 5 to 11, where A is a rated capacity [Ah] of the battery, and Sa is an area [m$^2$] of the part of the principal surface of the negative electrode active material-containing layer, the part facing the positive electrode active material-containing layer. The battery according to this embodiment has excellent rate characteristics. The ratio A/Sa is more preferably from 6 to 8.

For other details of the electrode group, refer to the description of the electrode group according to the second embodiment.

In the nonaqueous electrolyte battery, which is an example of the battery according to the third embodiment, the nonaqueous electrolyte may be held, for example, in a state in which the electrode group is impregnated with the nonaqueous electrolyte. Alternatively, in the battery of another example according to the third embodiment, the electrolyte solution containing the electrolyte may be held, for example, in a state in which the electrode group is impregnated with the electrolyte solution.

The battery according to the third embodiment can further include a container member. The container member can house the electrode group and the electrolyte. In the case of the nonaqueous electrolyte battery, the electrode group may be impregnated with the nonaqueous electrolyte inside the container member. A part of each of the positive electrode terminal and the negative electrode terminal can be extended from the container member.

The rated capacity of the battery according to the third embodiment is preferably within a range of from 5 Ah to 80 Ah.

Next, the nonaqueous electrolyte and the container member that can be included in the nonaqueous electrolyte battery, which is an example of the battery according to the third embodiment, will be described in more detail.

(Nonaqueous Electrolyte)

As the nonaqueous electrolyte, for example, a liquid nonaqueous electrolyte or a gel nonaqueous electrolyte can be used.

The liquid nonaqueous electrolyte can be prepared by dissolving an electrolyte in an organic solvent. The concentration of the electrolyte is preferably in a range of from 0.5 mol/l to 2.5 mol/l. The gel nonaqueous electrolyte is prepared by combining a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoride arsenate ($LiAsF_6$), lithium trifluoromethanesulfonate ($LiCF_3SO_3$), and lithium bistrifluoromethylsulfonylimide [$LiN(CF_3SO_2)_2$]. As the electrolyte, one of these electrolytes may be used alone, or two or more electrolytes may be used in combination. The electrolyte preferably includes $LiPF_6$.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methyl ethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoxyethane (DEE); acetonitrile (AN), and sulfolane (SL). As the organic solvent, one of these solvents may be used alone, or two or more solvents may be used in combination.

More preferred examples of the organic solvent include a mixed solvent obtained by mixing two or more selected from the group consisting of propylene carbonate (PC), ethylene carbonate (EC), diethyl carbonate (DEC), dimethyl carbonate (DMC), and methyl ethyl carbonate (MEC). By using such a mixed solvent, a nonaqueous electrolyte battery having excellent charge-and-discharge cycle characteristics can be obtained. An additive may be added to the electrolyte solution.

(Container Member)

As the container member, for example, a bag-shaped container made of a laminate film or a metal container can be used.

The shape of the container member is not particularly limited, and examples thereof include flat, square, cylindrical, coin-shaped, button-shaped, sheet-shaped, and stacked. Of course, the container member may be of a compact battery mounted on mobile electronic devices, or a large battery mounted on vehicles such as two- to four-wheel automobiles.

As the laminate film, for example, a multilayer film in which a metal layer is sandwiched between resin films can be used. Alternatively, a multilayer film including a metal layer and a resin layer covering the metal layer may be used. The resin film and the resin layer have a role of reinforcing the metal layer.

The metal layer is preferably aluminum foil or aluminum alloy foil so as to reduce weight. As the resin film, for example, a polymer material such as polypropylene (PP), polyethylene (PE), nylon, or polyethylene terephthalate (PET) can be used. The laminate film can be formed into the shape of the container member by heat-sealing. A wall thickness of the laminate film is preferably 0.2 mm or less.

The metal container can be formed of aluminum or an aluminum alloy. The aluminum alloy preferably includes an element such as magnesium, zinc, or silicon. On the other hand, an amount of a transition metal such as iron, copper, nickel, or chromium included in the alloy is preferably 100 ppm or less. Thereby, a long-term reliability and a heat dissipating ability in a high-temperature environment can be increased greatly. A wall thickness of the metal container is preferably 0.5 mm or less, more preferably 0.2 mm or less.

<Measurement Method>

Hereinafter, each measurement method will be described.

[Measurement of Facing Area Sa]

First, a battery to be measured is disassembled through the procedure described above. An electrode group is taken out of the disassembled battery.

In the case of a wound-type electrode group, the winding of the electrode group is released while being careful not to damage the positive electrode active material-containing layer and the negative electrode active material-containing layer. In the developed electrode group (laminate), an area of a portion where the negative electrode active material-containing layer and the positive electrode active material-containing layer overlap each other is measured. Care is taken not to damage the positive electrode active material-containing layer and the negative electrode active material-containing layer even when the positive electrode, negative electrode, and/or separator are peeled from the laminate. An area of a portion of the main surface of the negative electrode active material-containing layer that faces the positive electrode active material-containing layer in the wound state is also measured.

In the case of an electrode group having a stack-type structure, an area of a portion where the negative electrode active material-containing layer and the positive electrode active material-containing layer overlap each other is measured in the electrode group. When the positive electrode, negative electrode, and/or separator are peeled from the laminate, care is taken not to damage the positive electrode active material-containing layer and the negative electrode active material-containing layer.

A length of the overlapping portion of the negative electrode active material-containing layer and the positive electrode active material-containing layer is measured by using a measuring means such as a ruler or a tape measure according to the length.

The area Sa is a macroscopic area of a portion of the main surface of the negative electrode active material-containing layer that faces the positive electrode active material-containing layer, and does not include, for example, an area of pores of the negative electrode active material-containing layer.

[Measurement of Rated Capacity]

The rated capacity of the battery is measured through the following procedure. First, the battery to be measured is charged at a constant current of 0.2 C in a 25° C. environment until the voltage reaches 2.9 V. Then, the battery is discharged at a constant voltage of 2.9 V for 1 hour. Subsequently, the battery is left in an open circuit state for 30 minutes. Then, the battery is discharged at a constant current of 0.2 C until the voltage reaches 1.5 V. A capacity obtained through this discharge is defined as a rated capacity [Ah].

Next, several examples of the battery according to the third embodiment will be specifically described with reference to the drawings.

Figure 7:
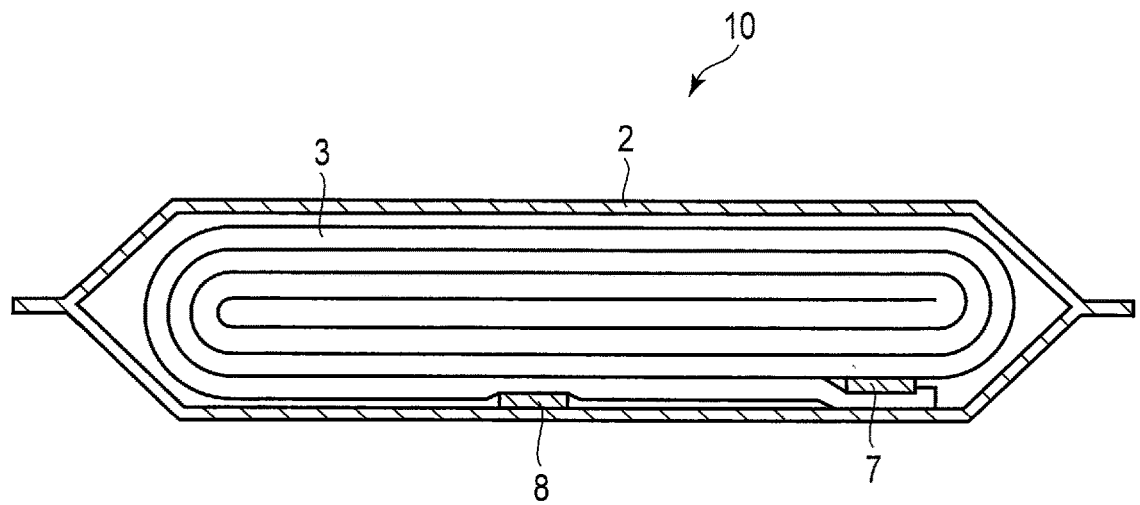
FIG. 7 is a schematic cross-sectional view of a battery of an example according to a third embodiment.

FIG. 7 is a schematic cross-sectional view of a battery of an example according to the third embodiment.

A battery 10 shown in FIG. 7 is a nonaqueous electrolyte battery. The nonaqueous electrolyte battery 10 includes a flat wound-type electrode group 3, which has been described above with reference to FIGS. 4 and 5. The flat wound-type electrode group 3 is housed inside a bag-shaped container member 2 made of a laminate film. The laminate film includes a metal layer and two resin films sandwiching the metal layer.

In the vicinity of the outer peripheral end of the wound-type electrode group 3, a negative electrode terminal 8 is connected to a negative electrode current collector 5a of the outermost layer of a negative electrode 5, and a positive electrode terminal 7 is connected to a positive electrode current collector 4a of a positive electrode 4 located on the inner side. The negative electrode terminal 8 and the positive electrode terminal 7 extend to the outside through an opening of the bag-shaped container member 2.

The nonaqueous electrolyte battery 10 shown in FIG. 7 further includes a nonaqueous electrolyte (not shown). The nonaqueous electrolyte is housed inside the container member 2 in a state in which the electrode group 3 is impregnated with the nonaqueous electrolyte.

The nonaqueous electrolyte can be injected, for example, through the opening of the bag-shaped container member 2. After the nonaqueous electrolyte is injected, the opening of the bag-shaped container member 2 is heat-sealed with the negative electrode terminal 8 and the positive electrode terminal 7 held therein so that the wound-type electrode group 3 and the nonaqueous electrolyte can be completely sealed.

Figure 8:
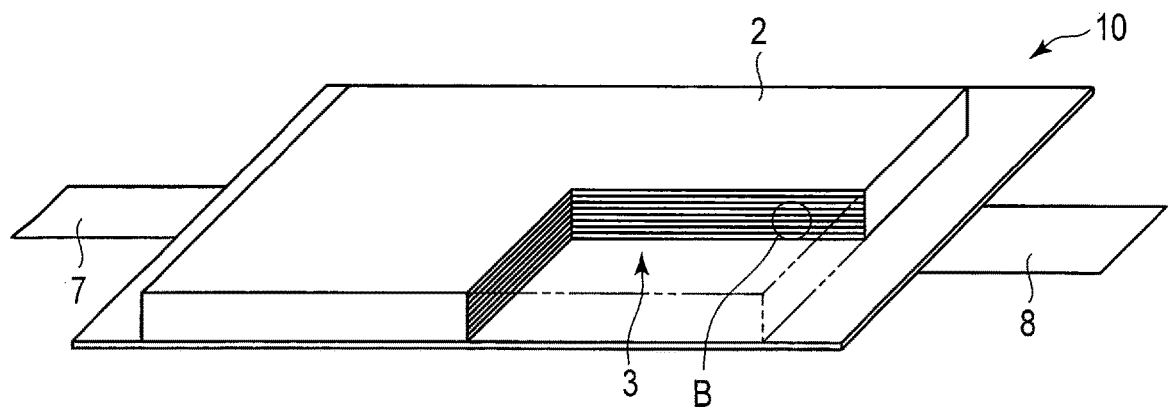
FIG. 8 is a schematic cross-sectional view of a battery of another example according to the third embodiment.
Figure 9:
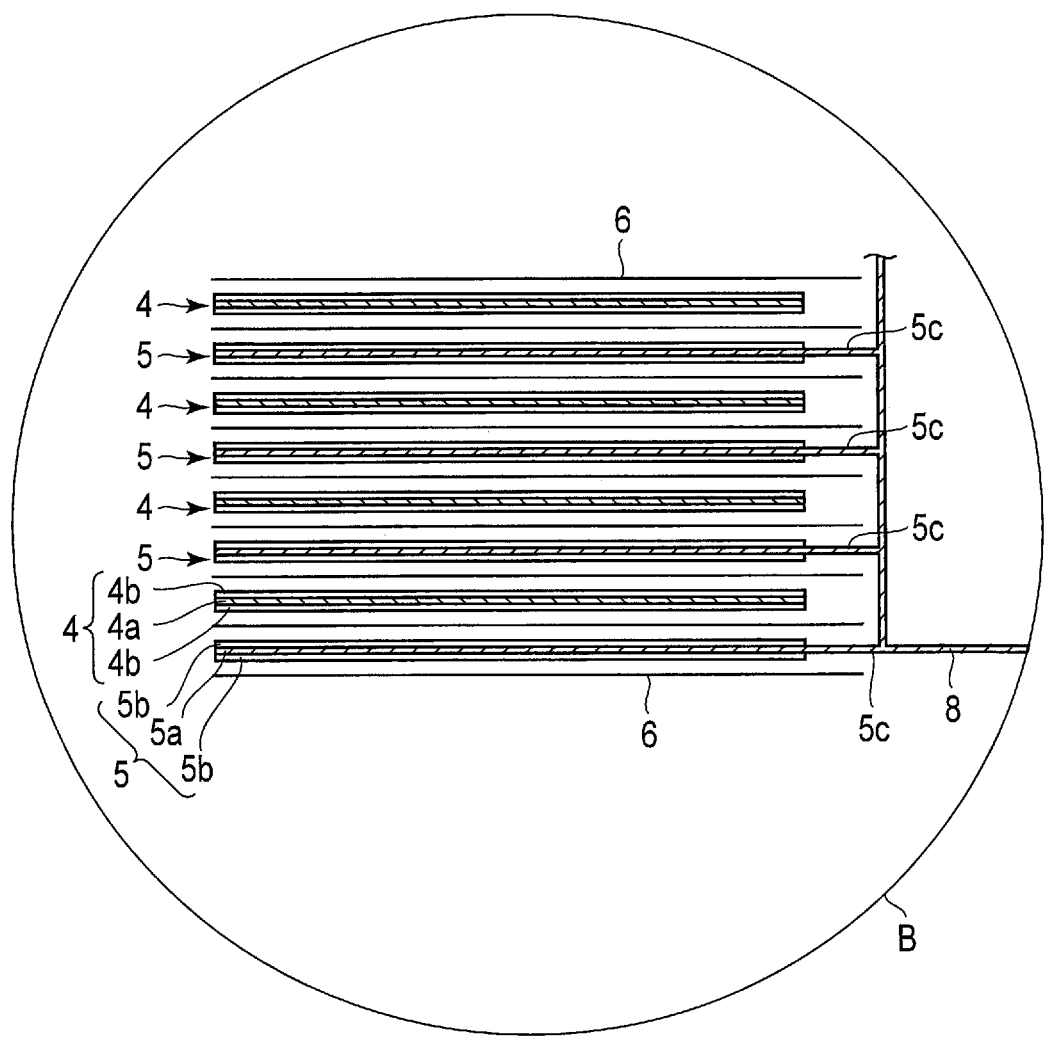
FIG. 9 is an enlarged cross-sectional view of a portion B of the battery of FIG. 8.

The battery according to the third embodiment is not limited to the battery having the above-described configuration shown in FIG. 7 and may have a configuration shown in FIGS. 8 and 9, for example.

FIG. 8 is a schematic partially cutaway perspective view of a battery of another example according to the third embodiment. FIG. 9 is an enlarged cross-sectional view of a portion B of the battery in FIG. 8.

A battery 10 shown in FIGS. 8 and 9 is a nonaqueous electrolyte battery. The nonaqueous electrolyte battery 10 includes a stack-type electrode group 3. The stack-type electrode group 3 is housed inside a container member 2 made of a laminate film. The laminate film includes a metal layer and two resin films sandwiching the metal layer therebetween.

As shown in FIG. 9, the stack-type electrode group 3 has a structure in which a positive electrode 4 and a negative electrode 5 are alternately stacked with a separator 6 interposed therebetween. There are a plurality of positive electrodes 4, each of which includes a positive electrode current collector 4a and positive electrode active material-containing layers 4b formed on both surfaces of the positive electrode current collector 4a. There are a plurality of negative electrodes 5, each of which includes a negative electrode current collector 5a and negative electrode active material-containing layers 5b formed on both surfaces of the negative electrode current collector 5a. One side of the negative electrode current collector 5a of each negative electrode 5 protrudes from the positive electrode 4. A portion 5c of the negative electrode current collector 5a, the portion 5c protruding from the positive electrode 4, is electrically connected to a strip negative electrode terminal 8. A tip of the strip negative electrode terminal 8 is drawn out from the container member 2 to the outside. Although not shown, a side of the positive electrode current collector 4a of the positive electrode 4, the side being located on the side opposite to the protruding side 5c of the negative electrode current collector 5a, protrudes from the negative electrode 5. A portion of the positive electrode current collector 4a, the portion protruding from the negative electrode 5, is electrically connected to a strip positive electrode terminal 7. A tip of the strip positive electrode terminal 7 is located on the side opposite to the negative electrode terminal 8 and is drawn out from a side of the container member 2 to the outside.

The positive electrode 4 shown in FIG. 9 is an example of the electrode according to the first embodiment. Thus, the electrode group 3 shown in FIGS. 8 and 9 is an example of the electrode group according to the second embodiment.

The battery according to the third embodiment includes the electrode group according to the second embodiment. Thus, the battery according to the third embodiment can exhibit excellent input/output characteristics and excellent life characteristics.

Fourth Embodiment

According to a fourth embodiment, a battery pack is provided. This battery pack includes the battery according to the third embodiment.

The battery pack according to the fourth embodiment can include a plurality of batteries. The plurality of batteries can be electrically connected in series or electrically connected in parallel. Alternatively, a plurality of batteries can be connected by a combination of series connection and parallel connection.

For example, the battery pack according to the fourth embodiment may include a plurality of batteries according to the third embodiment. These batteries can be connected in series. Further, the batteries connected in series can constitute a battery module. That is, the battery pack according to the fourth embodiment may include a battery module.

The battery pack according to the fourth embodiment can include a plurality of battery modules. The plurality of battery modules can be connected in series, in parallel, or by a combination of series connection and parallel connection.

An example of the battery pack according to the fourth embodiment will be described in detail with reference to FIGS. 10 and 11.

Figure 11:
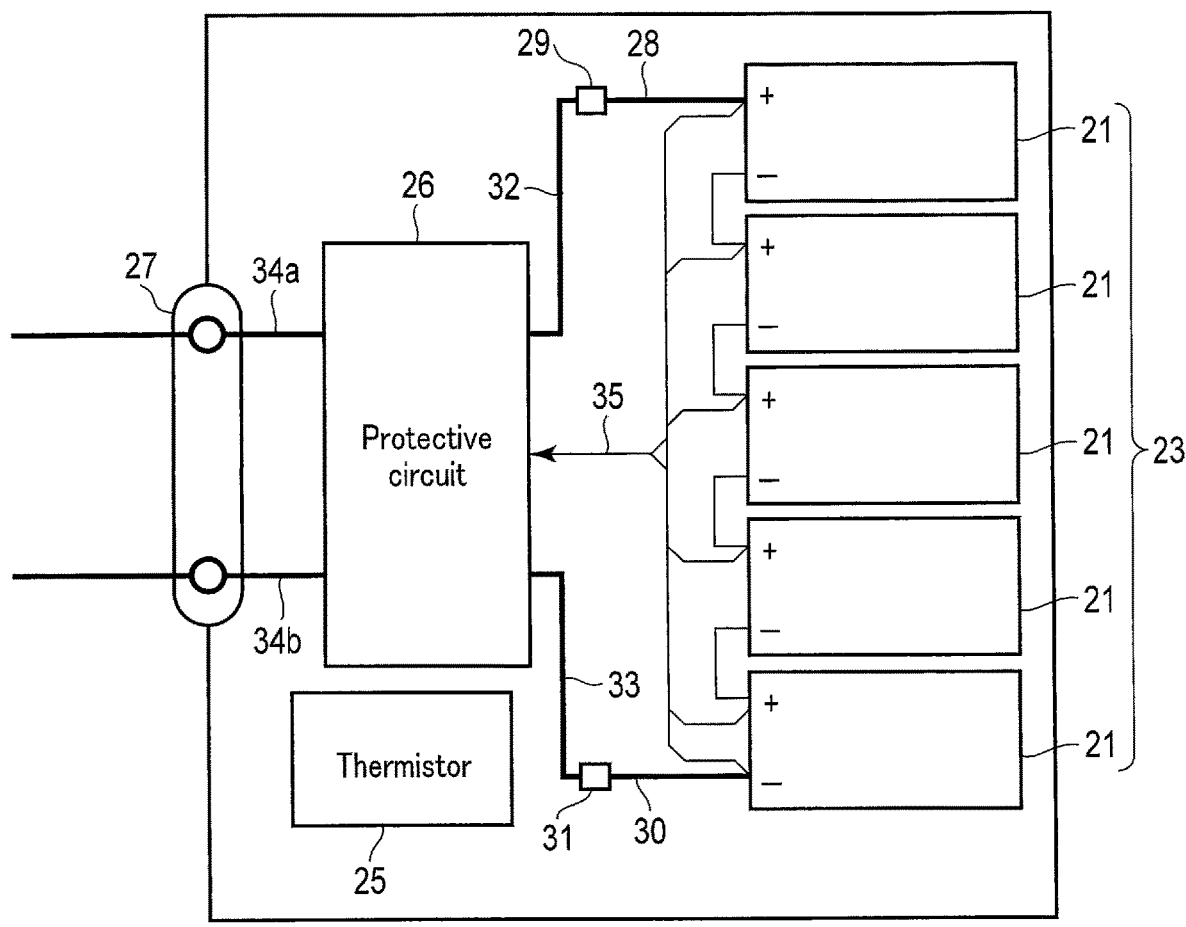
FIG. 11 is a block diagram showing an electric circuit of the battery pack of FIG. 10.

A battery pack 20 shown in FIGS. 10 and 11 includes a plurality of unit cells 21. The flat-type battery shown in FIG. 7 can be used as the unit cell 21.

A plurality of unit cells 21 constituted by the flat-type nonaqueous electrolyte batteries 10 shown in FIG. 7 are stacked so that the negative electrode terminal 8 and the positive electrode terminal 7 extending to the outside are aligned in the same direction, and are fastened by an adhesive tape 22 to constitute a battery module 23. As shown in FIG. 11, these unit cells 21 are electrically connected to each other in series.

A printed wiring board 24 is disposed to face the side surface of the unit cells 21, from which the negative electrode terminal 8 and the positive electrode terminal 7 protrude. As shown in FIG. 11, a thermistor 25, a protective circuit 26, and a conducting terminal 27 that conducts electricity to an external device are mounted on the printed wiring board 24. An electric insulating plate (not shown) is attached to the surface of the printed wiring board 24 that faces the battery module 23 to avoid unnecessary connection with wires of the battery module 23.

A positive electrode-side lead 28 is connected to the positive electrode terminal 7 located in the lowermost layer of the battery module 23, and a tip thereof is inserted into and electrically connected to a positive electrode-side connector 29 of the printed wiring board 24. A negative electrode-side lead 30 is connected to the negative electrode terminal 8 located in the uppermost layer of the battery module 23, and a tip thereof is inserted into and electrically connected to a negative electrode-side connector 31 of the printed wiring board 24. These connectors 29 and 31 are connected to the protective circuit 26 through wires 32 and 33 formed on the printed wiring board 24.

The thermistor 25 detects the temperature of the unit cells 21, and a detection signal thereof is sent to the protective circuit 26. The protective circuit 26 can disconnect a plus-side wire 34a and a minus-side wire 34b, which connect between the protective circuit 26 and the conducting terminal 27 for an external device, under a predetermined condition. The predetermined condition is, for example, when the temperature detected by the thermistor 25 rises to a predetermined temperature or higher. Also, the predetermined condition is when overcharge, overdischarge, overcurrent, etc. of the unit cells 21 is detected. The detection of the overcharge, etc. is performed for each individual unit cell 21 or the entire battery module 23. When detecting the overcharge, etc. for each individual unit cell 21, a battery voltage may be detected, or a positive electrode potential or negative electrode potential may be detected. In the latter case, a lithium electrode used as a reference electrode is inserted into each individual unit cell 21. In the case of FIGS. 10 and 11, a wire 35 for voltage detection is connected to each of the unit cells 21, and detection signals are transmitted to the protective circuit 26 through these wires 35.

A protective sheet 36 made of rubber or resin is disposed on each of three side surfaces of the battery module 23, excluding the side surface from which the positive electrode terminal 6 and the negative electrode terminal 7 protrude.

The battery module 23 is housed in a housing container 37 together with the protective sheets 36 and the printed wiring board 24. That is, the protective sheets 36 are respectively disposed on both inner side surfaces in the long-side direction and one inner side surface in the short-side direction of the housing container 37, and the printed wiring board 24 is disposed on the other inner side surface in the short-side direction. The battery module 23 is located in a space surrounded by the protective sheets 36 and the printed wiring board 24. A lid 38 is attached to the top surface of the housing container 37.

In order to fix the battery module 23, a heat-shrinkable tape may be used in place of the adhesive tape 22. In this case, the protective sheets are disposed on both side surfaces of the battery module, the heat-shrinkable tape is wound around the battery module and the protective sheets, and then the heat-shrinkable tape is thermally shrunk to bind the battery module.

In FIGS. 10 and 11, the unit cells 21 are connected in series, but may be connected in parallel to increase the battery capacity. Assembled battery packs can be connected in series and/or in parallel.

The form of the battery pack according to the fourth embodiment is appropriately changed depending on usage. The battery pack according to the third embodiment is suitable for use where excellent cycle characteristics are required when a large current is extracted. Specifically, the battery pack is used as a power supply for a digital camera, or as an in-vehicle battery of a vehicle such as a train, a two- to four-wheel hybrid electric automobile, a two- to four-wheel electric automobile, and an electric assist bicycle. In particular, it is suitably used as an in-vehicle battery.

Since the battery pack according to the fourth embodiment includes the battery according to the third embodiment, the battery pack can exhibit excellent input/output characteristics and excellent life characteristics.

EXAMPLE

Examples will be described below, but the present invention is not limited to the examples described below as long as the present invention does not deviate from the scope and spirit thereof.

[Production of Electrode]

Example 1

In Example 1, a positive electrode of Example 1 was produced through the following procedure.

First, as a positive electrode active material, a powder of a lithium nickel cobalt manganese composite oxide having a composition represented by the formula $LiNi_{0.33}Co_{0.34}Mn_{0.33}O_2$ and a powder of a lithium cobalt composite oxide having a composition represented by the formula $LiCoO_2$ were prepared. The powder of the lithium nickel cobalt manganese composite oxide was the powder of secondary particles and had an average secondary particle size of 8 μm. The powder of the lithium cobalt composite oxide was the powder of primary particles and had an average primary particle size of 10 μm. These powders were mixed at a lithium nickel cobalt manganese composite oxide-to-lithium cobalt composite oxide mass ratio of 90:10 to obtain a mixed powder.

The mixed powder, acetylene black as an electro-conductive agent, and polyvinylidene fluoride (PVdF) as a binder were put into N-methylpyrrolidone (NMP) as a solvent and mixed at a mixing ratio of 90% by mass:5% by mass:5% by mass.

Then, a mixture obtained in this manner was dispersed using a planetary centrifugal mixer. The mixture was further subjected to a high shear dispersion process using a bead mill apparatus. A zirconia bead of 1 mmφ was used as a bead. The dispersion conditions were a bead filling rate of 60% by volume and a rotation speed of 1500 rpm. The flow rate was adjusted so that the processing time was 10 minutes. In this manner, a slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.2 t/cm. In this manner, an electrode including the current collector and an active material-containing layer formed on both surfaces of the current collector, the active material-containing layer having a density of 3.0 g/cm³, was produced.

Example 2

In Example 2, an electrode was produced through the same procedure as in Example 1 except for the following points.

In Example 2, as a positive electrode active material, a powder of a lithium nickel cobalt manganese composite oxide having a composition represented by the formula $LiNi_{0.5}Co_{0.2}Mn_{0.3}O_2$ and a powder of a lithium cobalt composite oxide having a composition represented by the formula $LiCoO_2$ were prepared. The powder of the lithium nickel cobalt manganese composite oxide was the powder of secondary particles and had an average secondary particle size of 7 μm. The powder of the lithium cobalt composite oxide was the powder of primary particles and had an average primary particle size of 10 μm. These powders were mixed at a lithium nickel cobalt manganese composite oxide-to-lithium cobalt composite oxide mass ratio of 70:30 to obtain a mixed powder.

The mixed powder, acetylene black as an electro-conductive agent, and polyvinylidene fluoride (PVdF) as a binder were put into N-methylpyrrolidone (NMP) as a solvent and mixed at the same mixing ratio as in Example 1.

Then, a mixture obtained in this manner was dispersed using a planetary centrifugal mixer. The mixture was further subjected to a high shear dispersion process using a bead mill apparatus. The dispersion conditions were the same as those in Example 1. In this manner, a slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.2 t/cm. In this manner, an electrode including the current collector and an active material-containing layer formed on both surfaces of the current collector, the active material-containing layer having a density of 3.0 g/cm³, was produced.

Example 3

In Example 3, an electrode was produced through the same procedure as in Example 1 except for the following points.

In Example 3, as a positive electrode active material, a powder of a lithium nickel cobalt manganese composite oxide having a composition represented by the formula $LiNi_{0.5}Co_{0.3}Mn_{0.2}O_2$ and a powder of a lithium cobalt composite oxide having a composition represented by the formula $LiCoO_2$ were prepared. The powder of the lithium nickel cobalt manganese composite oxide was the powder of secondary particles and had an average secondary particle size of 7 μm. The powder of the lithium cobalt composite oxide was the powder of primary particles and had an average primary particle size of 10 μm. These powders were mixed at a lithium nickel cobalt manganese composite oxide-to-lithium cobalt composite oxide mass ratio of 80:20 to obtain a mixed powder.

The mixed powder, acetylene black as an electro-conductive agent, and polyvinylidene fluoride (PVdF) as a binder were put into N-methylpyrrolidone (NMP) as a solvent and mixed at the same mixing ratio as in Example 1.

Then, a mixture obtained in this manner was dispersed using a planetary centrifugal mixer to prepare a slurry.

The mixture is further subjected to a high shear dispersion process using a bead mill apparatus. The dispersion conditions were the same as those in Example 1. In this manner, the slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.2 t/cm. In this manner, an electrode including the current collector and an active material-containing layer formed on both surfaces of the current collector, the active material-containing layer having a density of 3.0 g/cm³, was produced.

Example 4

In Example 4, an electrode was produced through the same procedure as in Example 1 except for the following points.

In Example 4, positive electrode active material powders were mixed at a lithium nickel cobalt manganese composite oxide-to-lithium cobalt composite oxide mass ratio of 95:5.

The mixed powder, acetylene black as an electro-conductive agent, and polyvinylidene fluoride (PVdF) as a binder were put into N-methylpyrrolidone (NMP) as a solvent and mixed at a mixing ratio of 90% by mass:5% by mass:5% by mass.

Then, a mixture obtained in this manner was dispersed using a planetary centrifugal mixer. The mixture was further subjected to a high shear dispersion process using a bead mill apparatus. The dispersion conditions were the same as those in Example 1. In this manner, a slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.3 t/cm. In this manner, an electrode including the current collector and an active material-containing layer formed on both surfaces of the current collector, the active material-containing layer having a density of 3.0 g/cm³, was produced.

Example 5

In Example 5, an electrode was produced through the same procedure as in Example 4 except for the following points.

In Example 5, in preparing a slurry, a mixture was subjected to a dispersion process using a thin-film spin system high-speed mixer. The dispersion was performed at a peripheral speed of 10 m/sec for 10 seconds.

The slurry prepared in this manner was applied to both surfaces of a current collector made of aluminum foil having a thickness of 15 μm. The application amount was 70 g/m². Next, coating films were dried and subjected to pressing. The press condition was a linear pressure of 1.7 t/cm.

In this manner, an electrode including the current collector and an active material-containing layer formed on both surfaces of the current collector, the active material-containing layer having a density of 3.2 g/cm³, was produced.

Comparative Example 1

In Comparative Example 1, an electrode was produced through the same procedure as in Example 1 except for the following points.

In Comparative Example 1, in a dispersion process on a mixture for preparing a slurry, the rotation speed of a bead mill apparatus was 1000 rpm, and the flow rate was adjusted so that the dispersion process time was 5 minutes. Further, the linear pressure in a press process was 1.4 t/cm.

In this manner, an electrode including a current collector and an active material-containing layer formed on both surfaces of the current collector, the active material-containing layer having a density of 3.0 g/cm³, was produced.

Comparative Example 2

In Comparative Example 2, an electrode was produced through the same procedure as in Example 1 except for the following points.

In Comparative Example 2, positive electrode active material powders were mixed at a lithium nickel cobalt manganese composite oxide-to-lithium cobalt composite oxide mass ratio of 80:20.

The mixed powder, acetylene black as an electro-conductive agent, and polyvinylidene fluoride (PVdF) as a binder were put into N-methylpyrrolidone (NMP) as a solvent and mixed at a mixing ratio of 90% by mass:5% by mass:5% by mass.

Then, a mixture obtained in this manner was dispersed using a planetary centrifugal mixer. The mixture was further subjected to a high shear dispersion process in the same manner as in Comparative Example 1. In this manner, a slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.5 t/cm. In this manner, an electrode including the current collector and an active material-containing layer formed on both surfaces of the current collector, the active material-containing layer having a density of 3.0 g/cm³, was produced.

Comparative Example 3

In Comparative Example 3, an electrode was produced through the same procedure as in Comparative Example 2 except for the following points.

In Comparative Example 3, as a lithium nickel cobalt manganese composite oxide, a powder of the same lithium nickel cobalt manganese composite oxide as used in Example 3 was used. That is, in Comparative Example 3, a powder of a lithium nickel cobalt manganese composite oxide having a composition represented by the formula $LiNi_{0.5}Co_{0.3}Mn_{0.2}O_2$ was used.

In this manner, an electrode including a current collector and an active material-containing layer formed on both surfaces of the current collector, the active material-containing layer having a density of 3.0 g/cm³, was produced.

Comparative Example 4

In Comparative Example 4, an electrode was produced through the same procedure as in Example 1 except for the following points.

First, as a positive electrode active material, a powder of the same lithium nickel cobalt manganese composite oxide as used in Example 1 was prepared. That is, in this example, no lithium cobalt composite oxide was used.

The powder of the lithium nickel cobalt manganese composite oxide, acetylene black as an electro-conductive agent, and polyvinylidene fluoride (PVdF) as a binder were put into N-methylpyrrolidone (NMP) as a solvent and mixed at a mixing ratio of 90% by mass:5% by mass:5% by mass.

Then, a mixture obtained in this manner was dispersed using a planetary centrifugal mixer. The mixture was further subjected to a high shear dispersion process using a bead mill apparatus. The dispersion conditions were the same as those in Example 1. In this manner, a slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.6 t/cm. In this manner, an electrode including the current collector and an active material-containing layer formed on both surfaces of the current collector, the active material-containing layer having a density of 3.0 g/cm², was produced.

Comparative Example 5

In Comparative Example 5, an electrode was produced through the same procedure as in Example 1 except for the following points.

First, as a positive electrode active material, a powder of the same lithium cobalt composite oxide as used in Example 1 was prepared. That is, in this example, no lithium nickel cobalt manganese composite oxide was used.

The powder of the lithium cobalt composite oxide, acetylene black as an electro-conductive agent, and polyvinylidene fluoride (PVdF) as a binder were put into N-methylpyrrolidone (NMP) as a solvent and mixed at a mixing ratio of 90% by mass:5% by mass:5% by mass.

Then, a mixture obtained in this manner was dispersed using a planetary centrifugal mixer. The mixture was further subjected to a high shear dispersion process using a bead mill apparatus. The dispersion conditions were the same as those in Example 1. In this manner, a slurry was prepared.

Next, the prepared slurry was applied to both surfaces of a current collector made of aluminum foil having a thickness of 15 μm. The application amount was 70 g/m². Next, coating films were dried and subjected to pressing. The press condition was a linear pressure of 1.2 t/cm. In this manner, an electrode including the current collector and an active material-containing layer formed on both surfaces of the current collector, the active material-containing layer having a density of 3.0 g/cm³, was produced.

Comparative Example 6

In Comparative Example 6, an electrode was produced through the same procedure as in Example 1 except for the following points.

The rotation speed of a bead mill in a slurry dispersion process was 1.5 times that in the electrode of Example 1, and the load in a press process was 1.4 times that in the electrode in Example 1. Further, the electrode application amount was 140 g/m².

[Production of Nonaqueous Electrolyte Battery]

Next, a nonaqueous electrolyte battery of each example and each comparative example was produced through the following procedure using, as a positive electrode, each of the electrodes of Examples 1 to 5 and Comparative Examples 1 to 5 produced as described above. Hereinafter, the electrode, the current collector, and the active material-containing layer in each example will be referred to as "positive electrode", "positive electrode current collector", and "positive electrode active material-containing layer", respectively.

[Production of Negative Electrode]

First, as a negative electrode active material, a powder of lithium titanate having a composition represented by the formula $Li_4Ti_5O_{12}$ and having a spinel-type crystal structure was prepared.

Next, the powder of the lithium titanate, acetylene black as an electro-conductive agent, and polyvinylidene fluoride (PVdF) as a binder were put into N-methylpyrrolidone (NMP) as a solvent and mixed at a mixing ratio of 90% by mass:5% by mass:5% by mass. In this manner, a slurry was prepared.

The slurry was applied to both surfaces of a current collector made of aluminum foil having a thickness of 15 μm. In Examples 1 to 5 and Comparative Examples 1 to 5, the negative electrode application amount was 50 g/m². In Comparative Example 6, the negative electrode application amount was 100 g/m². Next, coating films were dried and subjected to pressing. The press condition was a linear pressure of 1.2 t/cm. In this manner, a negative electrode including the negative electrode current collector and a negative electrode active material-containing layer formed on both surfaces of the current collector, the negative electrode active material-containing layer having a density of 2.0 g/cm³, was produced.

[Production of Electrode Group]

Two separators each made of a polyethylene porous film having a thickness of 25 μm were prepared. Then, the positive electrode, one of the separators, the negative electrode, and the other separator were stacked in this order to obtain a stack. Then, the stack was spirally wound to obtain a wound body. Then, the wound body was hot-pressed at 90° C.

In this manner, a flat-shaped electrode group having a width of 30 mm, a height of 60 mm, and a thickness of 3.0 mm was produced.

A positive electrode terminal made of aluminum was welded to the positive electrode current collector of the obtained electrode group. Further, a negative electrode terminal made of aluminum was welded to the negative electrode current collector.

[Housing and Drying of Electrode Group]

Next, a container member made of a laminate film was prepared. The laminate film included aluminum foil having a thickness of 40 μm and polypropylene layers formed on both surfaces of the aluminum foil. The total thickness of the laminate film was 0.1 mm.

Next, the electrode group obtained as described above was housed in the container member with a part of the positive electrode terminal and a part of the negative electrode terminal located outside. Then, the periphery of the container member was heat-sealed with a part thereof left unsealed. In this state, the electrode group was subjected to vacuum drying at 80° C. for 24 hours.

[Preparation of Liquid Nonaqueous Electrolyte]

Propylene carbonate (PC) and diethyl carbonate (DEC) were mixed at a volume ratio of 1:1 to obtain a mixed solvent. $LiPF_6$ as an electrolyte was dissolved in the mixed solvent at a concentration of 1M to prepare a liquid nonaqueous electrolyte.

[Manufacture of Nonaqueous Electrolyte Battery]

The liquid nonaqueous electrolyte was injected into the container member in which the electrode group was housed as described above. Subsequently, the unsealed part of the periphery of the container member was heat-sealed to completely seal the electrode group and the nonaqueous electrolyte inside the container member. In this manner, a nonaqueous electrolyte battery having the above-described structure shown in FIG. 7, and having a width of 35 mm, a thickness of 3.2 mm, and a height of 65 mm was manufactured.

<Tests>

Tests described below were performed on each nonaqueous electrolyte battery produced as described above. Hereinafter, each nonaqueous electrolyte battery will be merely referred to as "battery".

[Measurement of Rated Capacity]

The rated capacity of the battery was measured through the procedure described above. Results are shown in Table 1 below.

[Output Test]

The battery was subjected to an output test following the following procedure.

First, the battery was charged at a constant current of 0.2 C in a 25° C. environment until the voltage reached 2.9 V. Then, the battery was discharged at a constant voltage of 2.9 V for 1 hour. Subsequently, the battery was left in an open circuit state for 1 hour. Then, the battery was discharged at a constant current of 1 C until the voltage reached 1.5 V.

Then, the battery was charged at a constant current of 0.2 C in a 25° C. environment until the voltage reached 2.9 V. Then, the battery was discharged at a constant voltage of 2.9 V for 1 hour. Subsequently, the battery was left in an open circuit state for 1 hour. Then, the battery was discharged at a constant current of 10 C until the battery voltage reached 1.5 V.

The ratio (%) of a capacity obtained through the 10 C discharge to a capacity obtained through the 1 C discharge was calculated. The calculated ratio was used as an index of the output characteristics. Results are shown in Table 1 below.

[Input Test]

The battery was subjected to an input test following the following procedure.

First, the battery was discharged at a constant current of 0.2 C until the voltage reached 1.5 V. Subsequently, the battery was left in an open circuit state for 1 hour. Then, the battery was charged at a constant current of 1 C until the voltage reached 2.9 V.

Then, the battery was discharged at a constant current of 0.2 C until the voltage reached 1.5 V. Subsequently, the battery was left in an open circuit state for 1 hour. Then, the battery was charged at a constant current of 10 C until the voltage reached 2.9 V.

The ratio (%) of a capacity obtained through the 10 C charge to a capacity obtained through the 1 C charge was calculated. The calculated ratio was used as an index of the input characteristics. Results are shown in Table 1 below.

[Cycle Life Test]

The battery was subjected to a cycle life test following the following procedure.

The battery was charged at a constant current of 1 C in a 60° C. environment until the voltage reached 2.9 V. Then, the battery was charged at a constant voltage of 2.9 V. The charge was completed at a point when the current converged to a value corresponding to 0.05 C. Subsequently, the battery was left in an open circuit state for 10 minutes. Then, the battery was discharged at a constant current of 1 C until the voltage reached 1.5 V. A set of the charge, the leaving in an open circuit state, and the discharge was defined as one charge-and-discharge cycle. The charge-and-discharge cycle was repeated 500 times. The ratio (%) of a discharge capacity obtained at the 500th cycle to a discharge capacity obtained at the first cycle was calculated. The calculated ratio was used as an index of the cycle characteristics (life characteristics). Results are shown in Table 1 below.

[Acquisition of Pore Size Distribution using Mercury Intrusion Porosimetry]

The positive electrode included in the battery was subjected to the analysis of pore size distribution using mercury intrusion porosimetry described above.

Then, from the obtained result, a pore size at the first peak top indicating the highest intensity $I_1$ within the pore size range of from 0.1 μm to 1 μm and a pore size at the second peak top indicating the intensity $I_2$ which is the second highest intensity after the highest intensity $I_1$ in the pore size distribution of the positive electrode active material-containing layer, the pore size distribution being acquired using mercury intrusion porosimetry, were obtained.

The pore size at the first peak top, the pore size at the second peak top, and the intensity ratio $I_2/I_1$ are shown in Table 2 below.

[Measurement of Dimensions of Positive Electrode and Negative Electrode]

Dimensions of the positive electrode and the negative electrode included in the battery were measured through the procedure described above. Results thereof are shown in Table 3 below. The dimensions shown in Table 3 are as follows: $T_1$: the thickness of the positive electrode current collector; $T_2$: the thickness of the positive electrode active material-containing layer; $T_3$: the length of the pair of short sides of the positive electrode current collector; $T_4$: the length of the pair of short sides of the positive electrode active material-containing layer; $T_5$: the length of the pair of short sides of the negative electrode active material-containing layer; $T_6$: the length of the pair of short sides of the negative electrode current collector; $T_7$: the thickness of the positive electrode; and $T_8$: the thickness of the negative electrode. Table 3 also shows the ratio $T_2/T_1$ and the ratio $T_7/T_8$.

[Calculation of Co Content, Ni Content, and Mn Content in Positive Electrode Active Material-containing Layer]

The Co content, the Ni content, and the Mn content ($X_1$ [mol %], $X_2$ [mol %], and $X_3$ [mol %], respectively) in the positive electrode active material-containing layer were measured through the procedure described above. The Co content and the Ni content ($Y_1$ [mol %] and $Y_2$ [mol %], respectively) in the lithium nickel cobalt manganese composite oxide contained in the positive electrode active material-containing layer were also calculated.

From these results, the "ratio $X_1/(X_1+X_2+X_3)$" and the "ratio $Y_2/Y_1$" of each battery were calculated. Results thereof are shown in Table 4 below.

[Measurement of Wc and Wa]

For each battery, the mass Wc per unit area (g/m²) of the positive electrode active material-containing layer and the mass Wa per unit area (g/m²) of the negative electrode active material-containing layer were measured. From results thereof, the ratio Wc/Wa was calculated. The ratio Wc/Wa of each battery is shown in Table 4 below.

[Measurement of Facing Area]

For each battery, the area Sa of the part of the negative electrode active material-containing layer, the part facing the positive electrode active material-containing layer, was measured through the procedure described above.

The ratio of the rated capacity A to the area Sa is shown in Table 4 below.

TABLE 1

| Table 1 | Rated Capacity A [mAh] | Output Characteristics | Input Characteristics | Cycle Characteristics |
|---|---|---|---|---|
| Example 1 | 300 | 62% | 59% | 88% |
| Example 2 | 300 | 58% | 55% | 83% |
| Example 3 | 300 | 65% | 61% | 80% |
| Example 4 | 300 | 60% | 57% | 89% |
| Example 5 | 300 | 58% | 55% | 90% |
| Comparative Example 1 | 300 | 45% | 38% | 79% |
| Comparative Example 2 | 300 | 47% | 40% | 74% |
| Comparative Example 3 | 300 | 48% | 43% | 71% |
| Comparative Example 4 | 300 | 42% | 34% | 79% |
| Comparative Example 5 | 300 | 45% | 40% | 67% |
| Comparative Example 6 | 300 | 29% | 25% | 75% |

TABLE 2

| Table 2 | Pore Size at First Peak Top [μm] | Pore Size at Second Peak Top [μm] | Intensity Ratio $I_2/I_1$ |
|---|---|---|---|
| Example 1 | 0.2 | 0.4 | 0.2 |
| Example 2 | 0.25 | 0.5 | 0.15 |
| Example 3 | 0.2 | 0.4 | 0.29 |
| Example 4 | 0.15 | 0.35 | 0.34 |
| Example 5 | 0.15 | 0.35 | 0.4 |
| Comparative Example 1 | 0.4 | 0.2 | 0.2 |
| Comparative Example 2 | 0.25 | 0.6 | 0.13 |
| Comparative Example 3 | 0.2 | 0.6 | 0.44 |
| Comparative Example 4 | 0.2 | 0.35 | 0.3 |
| Comparative Example 5 | 0.4 | 0.65 | 0.35 |
| Comparative Example 6 | 0.2 | — | — |

TABLE 3

| Table 3 | $T_1$ [μm] | $T_2$ [μm] | $T_3$ [μm] | $T_4$ [μm] | $T_5$ [μm] | $T_6$ [μm] | $T_7$ [μm] | $T_9$ [μm] | $T_2/T_1$ | $T_7/T_8$ |
|---|---|---|---|---|---|---|---|---|---|---|
| Example 1 | 15 | 23.3 | 60 | 55 | 56 | 60 | 61.7 | 65 | 1.55 | 0.95 |
| Example 2 | 15 | 23.3 | 60 | 55 | 56 | 60 | 61.7 | 65 | 1.55 | 0.95 |
| Example 3 | 15 | 23.3 | 60 | 55 | 56 | 60 | 61.7 | 65 | 1.55 | 0.95 |
| Example 4 | 15 | 23.3 | 60 | 55 | 56 | 60 | 61.7 | 65 | 1.55 | 0.95 |
| Example 5 | 15 | 21.9 | 60 | 53 | 54 | 60 | 58.8 | 65 | 1.46 | 0.9 |
| Comparative Example 1 | 15 | 23.3 | 60 | 55 | 56 | 60 | 61.7 | 65 | 1.55 | 0.95 |
| Comparative Example 2 | 15 | 23.3 | 60 | 55 | 56 | 60 | 61.7 | 65 | 1.55 | 0.95 |
| Comparative Example 3 | 15 | 23.3 | 60 | 55 | 56 | 60 | 61.7 | 65 | 1.55 | 0.95 |
| Comparative Example 4 | 15 | 23.3 | 60 | 55 | 56 | 60 | 61.7 | 65 | 1.55 | 0.95 |
| Comparative Example 5 | 15 | 23.3 | 60 | 55 | 56 | 60 | 61.7 | 65 | 1.55 | 0.95 |
| Comparative Example 6 | 15 | 46.6 | 60 | 55 | 56 | 60 | 61.7 | 65 | 3.11 | 0.95 |

TABLE 4

| Table 4 | Ratio $X_1/(X_1 + X_2 + X_3)$ | Ratio $Y_2/Y_1$ | Ratio Wc/Wa | Ratio A/Sa |
|---|---|---|---|---|
| Example 1 | 0.41 | 0.97 | 1.4 | 7.2 |
| Example 2 | 0.44 | 2.5 | 1.4 | 7.2 |
| Example 3 | 0.44 | 1.67 | 1.4 | 7.2 |
| Example 4 | 0.373 | 0.97 | 1.4 | 7.2 |
| Example 5 | 0.373 | 0.97 | 1.4 | 7.2 |
| Comparative Example 1 | 0.41 | 0.97 | 1.4 | 7.2 |
| Comparative Example 2 | 0.47 | 0.97 | 1.4 | 7.2 |
| Comparative Example 3 | 0.44 | 1.67 | 1.4 | 7.2 |
| Comparative Example 4 | 0.34 | 0.97 | 1.4 | 7.2 |
| Comparative Example 5 | 1 | — | 1.4 | 7.2 |
| Comparative Example 6 | 0.41 | 0.97 | 1.4 | 3.6 |

The results shown in Table 1 show that the electrodes of Examples 1 to 5 could exhibit more excellent input/output characteristics and more excellent life characteristics than the electrodes of Comparative Examples 1 to 6. Moreover, as is apparent from Table 2 and Table 4, the active material-containing layer of each of the electrodes of Examples 1 to 5 satisfied formula (1): $0.15 \leq I_2/I_1 \leq 0.40$; formula (2): $0.31 \leq X_1/(X_1+X_2+X_3) \leq 0.55$; and formula (3): $0.7 \leq T_2/T_1 \leq 1.6$. Furthermore, as is apparent from Table 2, in the pore size distribution of the active material-containing layer, the pore size at the first peak top was smaller than the pore size at the second peak top. Considering these results, due to the reasons described above, it is considered that the electrodes of Examples 1 to 5 could prevent deterioration of the lithium nickel cobalt manganese composite oxide and the lithium cobalt composite oxide resulting from charge and discharge and also exhibit high electro-conductivity.

On the other hand, as is apparent from Table 2, in the pore size distribution of the active material-containing layer of the electrode of Comparative Example 1, the pore size at the first peak top was larger than the pore size at the second peak top. It is considered that this result means that the electrode of Comparative Example 1 did not include a sufficient number of pores present in the vicinity of the lithium nickel cobalt manganese composite oxide and the lithium cobalt composite oxide. Thus, it is considered that, when the electrode of Comparative Example 1 incorporated in a battery was used, the electrode could not achieve excellent life characteristics due to lack of Li ions in the vicinity of the lithium nickel cobalt manganese composite oxide and the lithium cobalt composite oxide resulting from charge and discharge. Moreover, it is considered that, in the electrode of Comparative Example 1, the insertion and extraction of Li ions could not be smoothly performed by the lithium nickel cobalt manganese composite oxide and the lithium cobalt composite oxide due to a local electrode reaction. As a result, it is considered that the electrode of Comparative Example 1 could not achieve excellent input/output characteristics.

In the electrode of Comparative Example 2, the intensity ratio $I_2/I_1$ was less than 0.15. It is considered that this result means that the electrode of Comparative Example 2 did not include a sufficient number of pores that connect pores present in the vicinity of the lithium nickel cobalt manganese composite oxide and the lithium cobalt composite oxide. Thus, it is considered that, when the electrode of Comparative Example 2 incorporated in a battery was used, the electrode could not achieve excellent life characteristics due to lack of Li ions in the vicinity of the lithium nickel cobalt manganese composite oxide and the lithium cobalt composite oxide resulting from charge and discharge. Moreover, it is considered that, in the electrode of Comparative Example 2, the insertion and extraction of Li ions could not be smoothly performed by the lithium nickel cobalt manganese composite oxide and the lithium cobalt composite oxide due to a local electrode reaction. As a result, it is considered that the electrode of Comparative Example 2 could not achieve excellent input/output characteristics.

In the electrode of Comparative Example 3, the intensity ratio $I_2/I_1$ was more than 0.40. It is considered that this result means that the electrode of Comparative Example 3 did not include a sufficient number of pores present in the vicinity of the lithium nickel cobalt manganese composite oxide and the lithium cobalt composite oxide. Thus, it is considered that the electrode of Comparative Example 3 could achieve neither excellent life characteristics nor excellent input/output characteristics due to the same reasons as in the electrode of Comparative Example 1.

The electrode of Comparative Example 4 included no lithium cobalt composite oxide. The electrode of Comparative Example 5 included no lithium nickel cobalt manganese composite oxide. It is considered that, although the electrodes of Comparative Examples 4 and 5 satisfied formula (1): $0.15 \leq I_2/I_1 \leq 0.40$, the electrodes of Comparative Examples 4 and 5 could achieve neither excellent life characteristics nor excellent input/output characteristics because either a lithium cobalt composite oxide or a lithium nickel cobalt manganese composite oxide is not included.

In the pore size distribution obtained by mercury intrusion porosimetry for the active material-containing layer of the electrode of Comparative Example 6, only one peak top was recognized within the pore size range of from 0.1 μm to 1 μm. That is, the pore size distribution of Comparative Example 6 included no second peak top. It is considered that this result means that the electrode of Comparative Example 6 included an extremely small number of pores that connect pores present in the vicinity of the lithium nickel cobalt manganese composite oxide and the lithium cobalt composite oxide. Thus, it is considered that the electrode of Comparative Example 6 exhibited even worse life characteristics and input/output characteristics than the electrode of Comparative Example 2.

The electrode of at least one of these embodiments and Examples includes the current collector and the active material-containing layer formed on the current collector. The active material-containing layer contains the lithium nickel cobalt manganese composite oxide and the lithium cobalt composite oxide. The pore size distribution obtained by mercury intrusion porosimetry for the active material-containing layer has the first peak top indicating the highest intensity $I_1$ within the pore size range of from 0.1 μm to 1 μm and the second peak top indicating the intensity $I_2$ which is the second highest intensity after the highest intensity $I_1$ within the pore size range of from 0.1 μm to 1 μm. The pore size at the first peak top is smaller than the pore size at the second peak top. The electrode satisfies the following formulae (1) to (3): formula (1): $0.15 \leq I_2/I_1 \leq 0.40$; formula (2): $0.31 \leq X_1/(X_1+X_2+X_3) \leq 0.55$; and formula (3): $0.7 \leq T_2/T_1 \leq 1.6$. When the electrode incorporated in a battery is used, the electrode can prevent deterioration of the lithium nickel cobalt manganese composite oxide and the lithium cobalt composite oxide resulting from charge and discharge and exhibit high electro-conductivity. As a result, the electrode can realize a battery capable of exhibiting excellent input/output characteristics and excellent life characteristics.

While certain embodiments have been described, these embodiments have been presented by way of example only, and are not intended to limit the scope of the invention. Indeed, these novel embodiments described herein may be embodied in a variety of other forms, and various omissions, substitutions and changes in the form of the embodiments described herein may be made without departing from the gist of the invention. The accompanying claims and their equivalents are intended to include these embodiments and modifications thereof as would fall within the scope and gist of the invention.

What is claimed is:

1. An electrode comprising:
a current collector; and
an active material-containing layer formed on the current collector, wherein
the active material-containing layer contains a lithium nickel cobalt manganese composite oxide and a lithium cobalt composite oxide,
pore size distribution obtained by mercury intrusion porosimetry for the active material-containing layer has a first peak top indicating a highest intensity $I_1$ within a pore size range of from 0.1 μm to 1 μm and a second peak top indicating an intensity $I_2$ which is a second highest intensity after the highest intensity $I_1$ within the pore size range,
a pore size at the first peak top is smaller than a pore size at the second peak top, and
the electrode satisfies:

$$0.15 \leq I_2/I_1 \leq 0.40; \qquad \text{formula (1)}$$

$$0.31 \leq X_1/(X_1+X_2+X_3) \leq 0.55; \text{ and} \qquad \text{formula (2)}$$

$$0.7 \leq T_2/T_1 \leq 1.6, \qquad \text{formula (3)}$$

where
$X_1$, $X_2$, and $X_3$ are a Co content [mol %], an Ni content [mol %], and an Mn content [mol %] in the active material-containing layer, respectively,
$T_1$ is a thickness [μm] of the current collector, and
$T_2$ is a thickness [μm] of the active material-containing layer.

2. The electrode according to claim 1, wherein
the current collector has a strip shape having a pair of long sides and a pair of short sides, the thickness $T_1$ of the current collector is within a range of from 10 μm to 25 μm, and
a length $T_3$ of the pair of short sides is within a range of from 20 mm to 100 mm.

3. The electrode according to claim 2, wherein
the active material-containing layer has a strip shape having a pair of long sides and a pair of short sides, and
a length $T_4$ of the pair of short sides of the active material-containing layer is within a range of from 20 mm to 90 mm.

4. The electrode according to claim 1, wherein
a ratio $Y_2/Y_1$ in the lithium nickel cobalt manganese composite oxide is 1 or more,
where $Y_1$ is a Co content [mol %] in the lithium nickel cobalt manganese composite oxide, and $Y_2$ is an Ni content [mol %] in the lithium nickel cobalt manganese composite oxide.

5. The electrode according to claim 1, wherein the active material-containing layer comprises a secondary particle of the lithium nickel cobalt manganese composite oxide.

6. An electrode group comprising:
a positive electrode comprising a positive electrode active material-containing layer;
a negative electrode comprising a negative electrode active material-containing layer, wherein
the positive electrode is the electrode according to claim 1, and
the positive electrode active material-containing layer is the active material-containing layer.

7. The electrode group according to claim 6, wherein
a ratio Wc/Wa is from 1.25 to 1.75,
where
Wc is a mass per unit area (g/m²) of the positive electrode active material-containing layer, and
Wa is a mass per unit area (g/m²) of the negative electrode active material-containing layer.

8. The electrode group according to claim 7, wherein the negative electrode active material-containing layer comprises at least one titanium-containing composite oxide selected from the group consisting of a spinel-type lithium titanium composite oxide and an orthorhombic-type titanium-containing composite oxide.

9. The electrode group according to claim 6, wherein
the positive electrode active material-containing layer has a pair of long sides and a pair of short sides,
the negative electrode active material-containing layer has a pair of long sides and a pair of short sides, and
the electrode group satisfies formula (4): $T_4<T_5$,
where
$T_4$ is a length [mm] of the pair of short sides of the positive electrode active material-containing layer, and
$T_5$ is a length [mm] of the pair of short sides of the negative electrode active material-containing layer.

10. A battery comprising:
the electrode group according to claim 6; and
an electrolyte.

11. The battery according to claim 10, wherein
at least a part of a principal surface of the negative electrode active material-containing layer faces the positive electrode active material-containing layer, and
a ratio A/Sa is from 5 to 11,
where
A is a rated capacity [Ah] of the battery, and
Sa is an area [m²] of the at least a part of the principal surface of the negative electrode active material-containing layer.

12. The battery according to claim 11, wherein the rated capacity A of the battery is within a range of from 5 Ah to 80 Ah.

13. A battery pack comprising the battery according to claim 10.

14. The battery pack according to claim 13, comprising a plurality of batteries, each of the plurality of batteries being the battery according to claim 10, wherein the plurality of batteries are electrically connected in series, in parallel, or in a combination of series and parallel.

* * * * *